United States Patent
Shukla et al.

(10) Patent No.: US 8,190,769 B1
(45) Date of Patent: May 29, 2012

(54) METHODS AND APPARATUS FOR PROVISIONING AT A NETWORK DEVICE IN RESPONSE TO A VIRTUAL RESOURCE MIGRATION NOTIFICATION

(75) Inventors: Amit Shukla, Sunnyvale, CA (US); Anjan Venkatramani, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 188 days.

(21) Appl. No.: 12/346,618

(22) Filed: Dec. 30, 2008

(51) Int. Cl.
*G06F 15/173* (2006.01)
(52) U.S. Cl. ......... 709/238; 709/211; 714/4.1; 718/104; 718/105
(58) Field of Classification Search .................. 709/211, 709/238; 714/4.1; 718/104, 105
See application file for complete search history.

(56) References Cited

U.S. PATENT DOCUMENTS

| | | | |
|---|---|---|---|
| 5,130,984 A | 7/1992 | Cisneros | |
| 5,138,615 A | 8/1992 | Lamport et al. | |
| 5,801,641 A | 9/1998 | Yang et al. | |
| 6,073,089 A | 6/2000 | Baker et al. | |
| 6,522,627 B1 | 2/2003 | Mauger | |
| 6,633,548 B2 | 10/2003 | Bachmutsky et al. | |
| 6,657,962 B1 | 12/2003 | Barri et al. | |
| 6,775,230 B1 | 8/2004 | Watanabe et al. | |
| 6,807,172 B1 | 10/2004 | Levenson et al. | |
| 6,970,902 B1 | 11/2005 | Moon | |
| 6,985,486 B1 | 1/2006 | Agrawal | |
| 7,027,412 B2 | 4/2006 | Miyamoto et al. | |
| 7,069,413 B1 | 6/2006 | Agesen et al. | |
| 7,075,934 B2 | 7/2006 | Chiussi et al. | |
| 7,221,676 B2 | 5/2007 | Green et al. | |
| 7,313,135 B2 | 12/2007 | Wyatt | |
| 7,327,680 B1 | 2/2008 | Kloth | |
| 7,369,561 B2 | 5/2008 | Wybenga et al. | |
| 7,406,038 B1 | 7/2008 | Oelke et al. | |
| 7,409,487 B1 | 8/2008 | Chen et al. | |
| 7,415,034 B2 | 8/2008 | Muller et al. | |
| 7,428,219 B2 | 9/2008 | Khosravi | |
| 7,430,164 B2 | 9/2008 | Bare | |

(Continued)

FOREIGN PATENT DOCUMENTS

EP 0 809 380 A2 11/1997

(Continued)

OTHER PUBLICATIONS

U.S. Appl. No. 12/346,608, filed Dec. 30, 2008, entitled "Methods and Apparatus Related to Data Transmissions Between Virtual Resources Via a Network Device" (80 pgs).

(Continued)

*Primary Examiner* — Thomas Dailey
(74) *Attorney, Agent, or Firm* — Cooley LLP

(57) ABSTRACT

In one embodiment, a method includes receiving on a network side of a data center network a migration notification related to migration of a virtual resource from a source host device to a target host device. The source host device and the target host device can be on a server side of the data center network different than the network side of the data center network. The virtual resource can be logically defined at the source host device. The method can also include defining, before migration of the virtual resource is completed, an identifier representing a mapping of the virtual resource to the target host device in response to the migration notification. The defining can be performed on the network side of the data center network.

20 Claims, 14 Drawing Sheets

U.S. PATENT DOCUMENTS

| | | | |
|---|---|---|---|
| 7,441,268 B2 | 10/2008 | Remedios | |
| 7,580,415 B2* | 8/2009 | Hudson et al. | 370/395.6 |
| 7,630,368 B2 | 12/2009 | Tripathi et al. | |
| 7,689,747 B2 | 3/2010 | Vega et al. | |
| 7,738,457 B2 | 6/2010 | Nordmark et al. | |
| 7,757,059 B1 | 7/2010 | Ofer et al. | |
| 7,788,411 B2 | 8/2010 | Belgaied et al. | |
| 7,836,212 B2 | 11/2010 | Tripathi et al. | |
| 2002/0118644 A1 | 8/2002 | Moir | |
| 2002/0194294 A1 | 12/2002 | Blumenau et al. | |
| 2003/0026287 A1 | 2/2003 | Mullendore et al. | |
| 2003/0065878 A1 | 4/2003 | Krishna et al. | |
| 2003/0142668 A1 | 7/2003 | Wyatt | |
| 2004/0151188 A1* | 8/2004 | Maveli et al. | 370/398 |
| 2004/0177157 A1 | 9/2004 | Mistry et al. | |
| 2004/0205253 A1 | 10/2004 | Arndt et al. | |
| 2005/0138308 A1 | 6/2005 | Morishita et al. | |
| 2005/0177552 A1 | 8/2005 | Bass et al. | |
| 2005/0192969 A1* | 9/2005 | Haga et al. | 707/10 |
| 2005/0198303 A1 | 9/2005 | Knauerhase et al. | |
| 2006/0259952 A1 | 11/2006 | Lok | |
| 2007/0005685 A1 | 1/2007 | Chau et al. | |
| 2007/0008949 A1 | 1/2007 | Balandin | |
| 2007/0014288 A1 | 1/2007 | Lim et al. | |
| 2007/0078988 A1* | 4/2007 | Miloushev et al. | 709/227 |
| 2007/0079307 A1 | 4/2007 | Dhawan et al. | |
| 2007/0140235 A1 | 6/2007 | Aysan et al. | |
| 2007/0204265 A1* | 8/2007 | Oshins | 718/1 |
| 2007/0211716 A1 | 9/2007 | Oz et al. | |
| 2007/0219911 A1 | 9/2007 | Abe | |
| 2007/0244997 A1 | 10/2007 | Tindal | |
| 2007/0280243 A1 | 12/2007 | Wray et al. | |
| 2007/0280253 A1 | 12/2007 | Rooholamini et al. | |
| 2007/0283186 A1* | 12/2007 | Madnani et al. | 714/6 |
| 2007/0297428 A1 | 12/2007 | Bose et al. | |
| 2008/0002663 A1 | 1/2008 | Tripathi et al. | |
| 2008/0005344 A1 | 1/2008 | Ford et al. | |
| 2008/0019365 A1 | 1/2008 | Tripathi et al. | |
| 2008/0043756 A1 | 2/2008 | Droux et al. | |
| 2008/0043765 A1 | 2/2008 | Belgaied et al. | |
| 2008/0046610 A1 | 2/2008 | Tripathi et al. | |
| 2008/0046735 A1 | 2/2008 | Nedeltchev et al. | |
| 2008/0080548 A1 | 4/2008 | Mullendore et al. | |
| 2008/0082977 A1 | 4/2008 | Araujo et al. | |
| 2008/0095361 A1 | 4/2008 | Wifvesson et al. | |
| 2008/0098392 A1 | 4/2008 | Wipfel et al. | |
| 2008/0130517 A1 | 6/2008 | Lee et al. | |
| 2008/0148341 A1 | 6/2008 | Ferguson | |
| 2008/0155223 A1 | 6/2008 | Hiltgen et al. | |
| 2008/0186875 A1 | 8/2008 | Kitani | |
| 2008/0192648 A1 | 8/2008 | Galles | |
| 2008/0205377 A1 | 8/2008 | Chao et al. | |
| 2008/0212592 A1 | 9/2008 | Wybenga et al. | |
| 2008/0219184 A1 | 9/2008 | Fowler et al. | |
| 2008/0225853 A1 | 9/2008 | Melman et al. | |
| 2008/0228781 A1 | 9/2008 | Chen et al. | |
| 2008/0240104 A1 | 10/2008 | Villait et al. | |
| 2008/0240122 A1 | 10/2008 | Richardson et al. | |
| 2008/0244579 A1 | 10/2008 | Muller | |
| 2008/0259934 A1 | 10/2008 | Matthews et al. | |
| 2008/0270564 A1 | 10/2008 | Rangegowda et al. | |
| 2009/0013062 A1 | 1/2009 | Blatherwick et al. | |
| 2009/0025007 A1 | 1/2009 | Hara et al. | |
| 2009/0037680 A1 | 2/2009 | Colbert et al. | |
| 2009/0052461 A1 | 2/2009 | Brown et al. | |
| 2009/0083445 A1 | 3/2009 | Ganga | |
| 2009/0106409 A1 | 4/2009 | Murata | |
| 2009/0106766 A1* | 4/2009 | Masuda | 718/104 |
| 2009/0109479 A1 | 4/2009 | Kato | |
| 2009/0135816 A1 | 5/2009 | Nandagopal et al. | |
| 2009/0150529 A1 | 6/2009 | Tripathi | |
| 2009/0157701 A1 | 6/2009 | Lahiri et al. | |
| 2009/0190598 A1 | 7/2009 | Christensen et al. | |
| 2009/0198761 A1 | 8/2009 | Nanda et al. | |
| 2009/0240790 A1* | 9/2009 | Utsunomiya et al. | 709/221 |
| 2009/0274044 A1 | 11/2009 | Goose et al. | |
| 2009/0276772 A1* | 11/2009 | Garrett et al. | 718/1 |
| 2009/0276774 A1 | 11/2009 | Kinoshita | |
| 2009/0292858 A1 | 11/2009 | Lambeth et al. | |
| 2009/0307597 A1 | 12/2009 | Bakman | |
| 2009/0313620 A1 | 12/2009 | Sedukhin et al. | |
| 2010/0027420 A1 | 2/2010 | Smith | |
| 2010/0042708 A1 | 2/2010 | Stamler et al. | |
| 2010/0042719 A1* | 2/2010 | Kinoshita | 709/225 |
| 2010/0043068 A1 | 2/2010 | Varadhan et al. | |
| 2010/0050172 A1 | 2/2010 | Ferris | |
| 2010/0054129 A1 | 3/2010 | Kuik et al. | |
| 2010/0077158 A1 | 3/2010 | Asano | |
| 2010/0091961 A1 | 4/2010 | Jones et al. | |
| 2010/0128605 A1 | 5/2010 | Chavan et al. | |
| 2010/0131636 A1 | 5/2010 | Suri et al. | |
| 2010/0165876 A1 | 7/2010 | Shukla et al. | |
| 2010/0165877 A1 | 7/2010 | Shukla et al. | |
| 2010/0169467 A1 | 7/2010 | Shukla et al. | |
| 2011/0096781 A1 | 4/2011 | Aybay | |
| 2011/0103259 A1 | 5/2011 | Aybay et al. | |

FOREIGN PATENT DOCUMENTS

| | | |
|---|---|---|
| GB | 2 361 139 A | 10/2001 |

OTHER PUBLICATIONS

U.S. Appl. No. 12/346,612, filed Dec. 30, 2008, entitled "Methods and Apparatus Related to Data Transmissions Between Virtual Resources At a Host Device" (78 pgs).

U.S. Appl. No. 12/346,615, filed Dec. 30, 2008, entitled "Methods and Apparatus for Routing Between Virtual Resources Based on a Routing Location Policy" (79 pgs).

U.S. Appl. No. 12/346,625, filed Dec. 30, 2008, entitled "Methods and Apparatus Related to Managing Communications Between Virtual Resources" (43 pgs).

U.S. Appl. No. 12/612,210, filed Nov. 4, 2009, entitled "Methods and Apparatus for Configuring a Virtual Network Switch" (50 pgs).

CISCO: "Cisco VN-Link: Virtualization-Aware Networking," Cisco Public Information, Cisco Systems, [Online] Mar. 1, 2009 (pp. 1-10), XP002593596, Retrieved from the Internet: <URL: http://www.cisco.com/en/US/solutions/collateral/ns340/ns517/ns224/ns892/ns894/white_paper_c11-525307.pdf> [retrieved on Jul. 26, 2010].

Office Action mailed Dec. 23, 2010 for U.S. Appl. No. 12/346,623 (19 pages).

Office Action mailed Jun. 16, 2011 for U.S. Appl. No. 12/346,623 (13 pages).

Office Action mailed Sep. 17, 2010 for U.S. Appl. No. 12/346,608 (28 pages).

Office Action mailed Apr. 14, 2011 for U.S. Appl. No. 12/346,608 (24 pages).

Office Action mailed Apr. 1, 2011 for U.S. Appl. No. 12/346,612 (19 pages).

Office Action mailed Sep. 15, 2010 for U.S. Appl. No. 12/346,615 (21 pages).

Office Action mailed Mar. 21, 2011 for U.S. Appl. No. 12/346,615 (9 pages).

Office Action mailed Sep. 17, 2010 for U.S. Appl. No. 12/346,625 (24 pages).

Office Action mailed Mar. 29, 2011 for U.S. Appl. No. 12/346,625 (13 pages).

Office Action mailed Oct. 28, 2010 for U.S. Appl. No. 12/346,630 (24 pages).

Office Action mailed Apr. 27, 2010 for U.S. Appl. No. 12/346,630 (15 pages).

Office Action mailed Oct. 5, 2010 for U.S. Appl. No. 12/346,632 (16 pages).

Office Action mailed Mar. 14, 2011 for U.S. Appl. No. 12/346,632 (21 pages).

Partial European Search Report dated Mar. 4, 2011 for European Application No. 10187574.8 (7 pages).

Partial European Search Report dated Feb. 4, 2011 for European Application No. 10188736.2 (7 pages).

U.S. Appl. No. 12/976,508, filed Dec. 22, 2010, entitled "Methods and Apparatus for Tunnel Management Within a Data Center" (42 pgs).

U.S. Appl. No. 12/981,678, filed Dec. 30, 2010, entitled "Apparatus, Systems and Methods for Aggregate Routes Within a Communications Network" (38 pgs).

Final Office Action mailed Jul. 26, 2011 for U.S. Appl. No. 12/346,608 (30 pages).

Final Office Action mailed Dec. 5, 2011 for U.S. Appl. No. 12/346,612 (24 pages).

Final Office Action mailed Dec. 14, 2011 for U.S. Appl. No. 12/346,625 (14 pages).

Final Office Action mailed Oct. 26, 2011 for U.S. Appl. No. 12/346,630 (17 pages).

Final Office Action mailed Aug. 15, 2011 for U.S. Appl. No. 12/346,632 (23 pages).

Office Action mailed Dec. 21, 2011 for U.S. Appl. No. 12/346,632 (27 pages).

Extended European Search Report mailed Aug. 17, 2011 for European Application No. 10187574.8 (10 pages).

Extended European Search Report dated May 10, 2011 for European Application No. 10188736.2 (10 pages).

\* cited by examiner

METHODS AND APPARATUS FOR PROVISIONING AT A NETWORK DEVICE IN RESPONSE TO A VIRTUAL RESOURCE MIGRATION NOTIFICATION

RELATED APPLICATIONS

This application is related to co-pending U.S. patent application Ser. No. 12/346,625, filed Dec. 30, 2008, entitled "Methods and Apparatus Related to Managing Communications Between Virtual Resources"; U.S. patent application Ser. No. 12/346,608, filed Dec. 30, 2008, entitled "Methods and Apparatus Related to Data Transmissions Between Virtual Resources via a Network Device"; related to co-pending U.S. patent application Ser. No. 12/346,612, filed Dec. 30, 2008, entitled "Methods and Apparatus Related to Data Transmissions Between Virtual Resources At A Host Device"; and related to co-pending U.S. patent application Ser. No. 12/346,615, filed Dec. 30, 2008, entitled "Methods and Apparatus for Routing Between Virtual Resources based on a Routing Location Policy"; all of which are incorporated herein by reference in their entireties.

BACKGROUND

Embodiments described herein relate generally to virtualized networking, and, in particular, to a network device configured to route data between virtual resources logically defined at a host device.

A host device (e.g., a physical server) associated with a data center network can be configured to host multiple virtual resources (e.g., guest operating systems, virtual machines (VMs)). The virtual resources can be configured to share a single or multiple network links (e.g., physical network links) connecting the host device to networked portions of the data center network. Known host devices often each include a local virtual switch module (also can be referred to as an embedded virtual switch or as a virtual bridge) configured to route data originating from one or more of the virtual resources to another of the virtual resources within the host device. Network devices (e.g., external switches, gateway devices) associated with the data center network but external to the host device may not have information on and/or control over the routing between virtual resources within the host device. Host devices with this type of closed virtualized routing environment may not be configured to scalably integrate with the data center network in a desirable fashion and/or may not provide desirable routing flexibility. In addition, the processing efficiency of known host devices can be undesirably affected by processing overhead related to virtual switch management.

Thus, a need exists for methods and apparatus for a network device, which is external to a host device, configured to route (or trigger routing of) data between virtual resources logically defined at the host device.

SUMMARY

In one embodiment, a method includes receiving on a network side of a data center network a migration notification related to migration of a virtual resource from a source host device to a target host device. The source host device and the target host device can be on a server side of the data center network different than the network side of the data center network. The virtual resource can be logically defined at the source host device. The method can also include defining, before migration of the virtual resource is completed, an identifier representing a mapping of the virtual resource to the target host device in response to the migration notification. The defining can be performed on the network side of the data center network.

DETAILED DESCRIPTION

Figure 1:
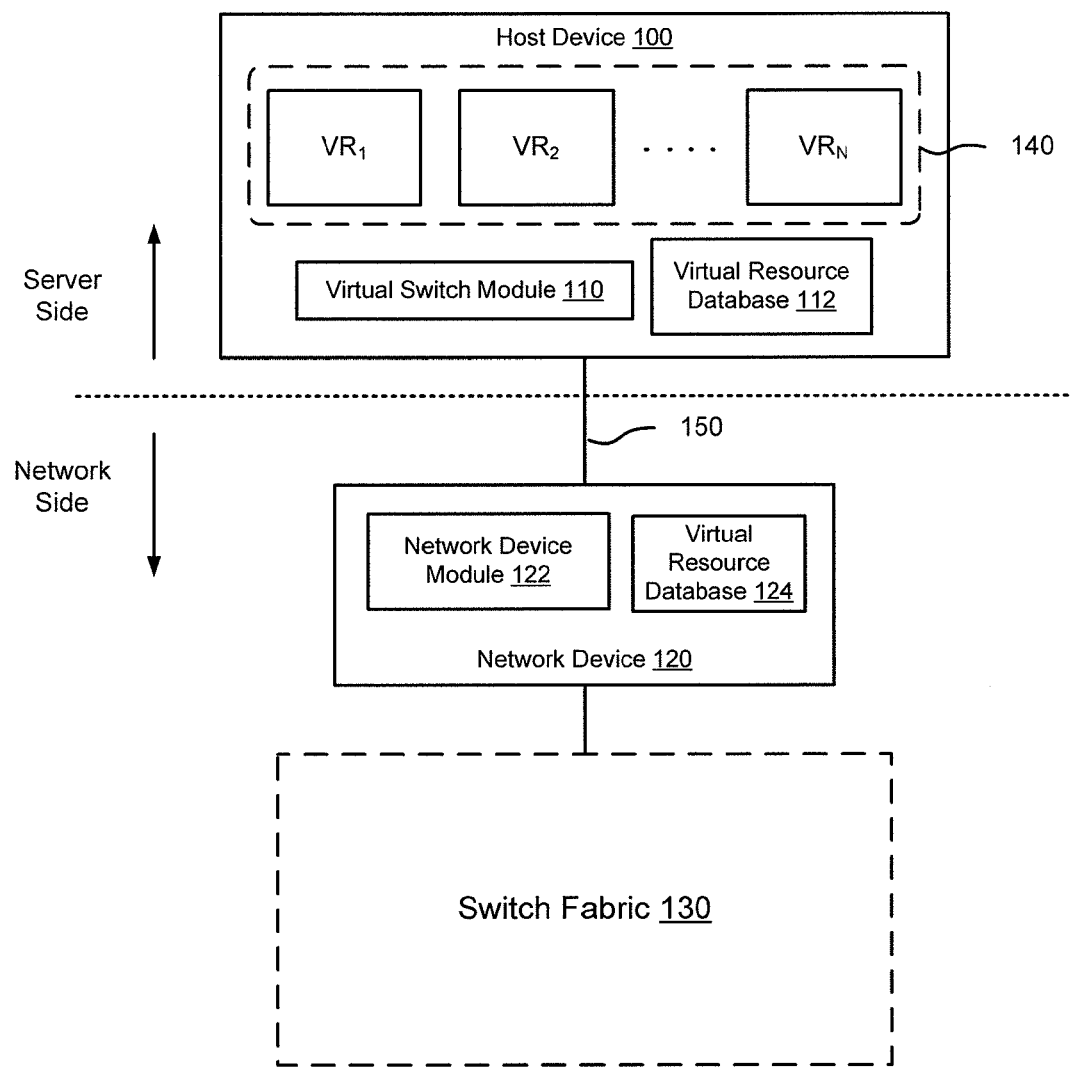
FIG. 1 is a schematic block diagram that illustrates a network device configured to route data between virtual resources at a host device, according to an embodiment.

A network device can be configured to route (e.g., trigger routing of, trigger switching of, perform an Ethernet bridging function for) data (e.g., a data packet, a string of bit values, a payload of data) between two or more virtual resources logically defined at a host device based on one or more routing instructions (e.g., a multi-cast routing instruction). Specifically, a network device module at the network device can be configured to route (e.g., trigger routing of, trigger switching of) data without of routing being performed at, for example, a virtual switch module (e.g., a virtual machine monitor, a hypervisor, a virtual bridge) at the host device. Said differently, the network device module at the network device can be configured to execute a routing instruction defined based on a routing policy rather than the routing instruction being executed at the virtual switch module of the host device. Accordingly, the network device can be referred to as an external switch device or as an external network device.

In some embodiments, a routing instruction can be determined based on a set of classification rules (e.g., open systems interconnection (OSI) layer-2 classification rules) that are implemented in, for example, hardware. In some embodiments, the routing instruction can be retrieved when one or more filter conditions (e.g., match conditions, policy conditions) are satisfied during a classification process (e.g., a classification algorithm). In some embodiments, retrieving a routing instruction based on a classification process can be referred to classifying. For example, a specified routing instruction can be retrieved from a database (e.g., a look-up table, a set of linked databases) when a filter condition is satisfied based on an identifier associated with a virtual resource and/or a destination address value associated with data. The filter conditions can be defined based on, for example, a policy related to an action control list (ACL), a policy related to a virtual local area network (VLAN), a policy related to a class of service (CoS) (e.g., a quality of service (QoS)), and/or so forth. Accordingly, the routing instruction can be, for example, determined based on a policy related to an action control list (ACL), determined based on an address value such as a destination media access control (MAC) address value, and/or so forth. In some embodiments, the filter conditions can be defined within one or more relationships that can also be referred to as network attribute relationships or classification relationships (because the relationships can be used to classify data). In some embodiments, the virtual identifier can be used to determine a logical interface (e.g., a VLAN identifier, a logical interface defined by a network administrator) and/or other parameter values (e.g., parameter values from fields within an Ethernet packet) that can be used within a classification process.

More details related to classification of data and determination of a routing instruction are set forth in co-pending patent application Ser. No. 12/242,172, filed on Sep. 30, 2008, entitled "Methods and Apparatus for Packet Classification based on Policy Vectors," and co-pending patent application Ser. No. 12/242,168, filed on Sep. 30, 2008, entitled "Methods and Apparatus related to Packet Classification associated with a Multi-Stage Switch," both of which are incorporated herein by reference in their entireties.

In some embodiments, the data can be forwarded and/or routed via a link between (e.g., separating) the network device and the host device. For example, data can be routed from a first virtual resource at the host device to a second virtual resource at the host device via the network device (e.g., via a link between the network device and the host device). This type of routing pattern can be referred to as hairpin routing. In some embodiments, the routing can be based on a protocol such as an Ethernet protocol and can be associated with layer-2 of the OSI model.

The virtual resources at the host device can be resources that are logically defined at the host device. In some embodiments, the virtual resources can be, for example, data processing resources (e.g., computing resources) such as virtual machines (e.g., a guest operating system) and/or virtual ports. In some embodiments, the virtual resources can be associated with (e.g., can define a portion of) one or more virtual local area networks (VLANs) (also can be referred to as VLAN groupings). In some embodiments, the virtual resources can be configured to operate based on, for example, various platforms (e.g., various communication protocols, various hardware types). In some embodiments, virtual resources such as virtual ports at the host device can have a MAC address value that is assigned by, for example, a network administrator.

In some embodiments, all or a portion of routing-related functions (e.g., switching functions) that can be performed at a host device can instead be performed at a network device. Thus, processing at the host device related to transmission of data can be reduced. For example, provisioning can be performed at the network device and management of routing for one or more host devices can be performed at the network device. In some embodiments, for example, MAC address values and/or VLAN groupings associated with virtual resources at the host device can be communicated (e.g., forwarded without being routed and/or classified) to the network device and can be used by the network device to perform routing functions without routing functions being performed at the host device. by offloading, the administrator of the servers doesn't have to manage virtual switching at each of the host devices.

During operation, routing (e.g., switching) between the virtual resources can be triggered based one or more identifiers associated with the virtual resources (also can be referred to as virtual resource identifiers) and/or an address value (e.g., a destination MAC address value, a broadcast MAC address value, a multi-cast MAC address value, an unknown unicast address value). Specifically, the routing can be determined and/or triggered based on one or more relationships (which can represent a filter condition and/or can be referred to as a classification relationship) between virtual resource identifiers, virtual resources, routing instructions, and/or address values. In some embodiments, the routing can be determined and/or triggered based on one or more additional parameter values included, for example, in a field of an Ethernet packet (e.g., a type of service field (ToS), a date/time field, a data type field). In some embodiments, the classification process can be based on, for example, VLAN identifiers and/or other logical interface values (e.g., internet protocol (IP) address values).

In some embodiments, a virtual resource identifier can, for example, represent a mapping of one or more virtual resources to a physical location such as a physical port or a host device. The virtual resource identifier can be different than, for example, a MAC address value that can be assigned by network administrator and can be associated with a virtual resource. In some embodiments, the MAC address value can be used as the basis for provision information. In some embodiments, the virtual resource identifiers can represent (or can represent a mapping of) a single virtual resource or can be associated with multiple virtual resources. Virtual resource identifiers associated with multiple virtual resources can be referred to as multi-resource identifiers. In some embodiments, the virtual resources identifiers can be referred to as virtual resource labels. In some embodiments, one or more virtual resource identifiers and/or data associated with the virtual resource identifier(s) can be included in data packets transmitted between the network device and the host device. In some embodiments, an association of a virtual resource identifier with data can be determined based on a destination virtual resource address value (e.g., based on a destination MAC address value).

During a provisioning session (which can occur before operation), relationships (which can represent filter conditions and/or can be referred to as classification relationships) between, for example, virtual resource identifiers, virtual resources, and/or routing instructions (e.g., service templates, configuration templates) can be defined at a network device. For example, a relationship (e.g., a classification relationship) between a virtual resource identifier and a routing instruction can be defined based on a mapping (e.g., a binding) of a virtual resource to one or more VLANs, ACLs, and/or CoS (e.g., quality of service (QoS)). In some embodiments, the relationships can be defined based on provision information obtained by the network device during the provisioning session. The provision information can include information related to virtual resources provisioned at a host device. The provision information can include, for example, an existence, a status, a functionality, a location, an identifier, and so forth of one or more of the virtual resources at the host device. One or more portions of the relationships between, for example, the virtual resource identifiers, virtual resources, and/or routing instructions defined at the network device can be transmitted to the host device and used at the host device during operation. The relationships can be stored in and/or made accessible from one or more virtual resource databases (e.g., look-up tables) at the host device and/or the network device. In some embodiments, the network device can be referred to as a network entity or as an external network device. In some embodiments, the provisioning session can be triggered in response to migration of a virtual resource.

FIG. 1 is a schematic block diagram that illustrates a network device 120 configured to route data (e.g., a data packet, a string of bit values, a payload of data) between virtual resources 140 at a host device 100, according to an embodiment. As shown in FIG. 1, the host device 100 has virtual resources $VR_1$ through $VR_N$, which can collectively be referred to as virtual resources 140. The virtual resources 140 can be, for example, data processing resources (e.g., computing resources) such as virtual machines and/or virtual ports that are logically defined at the host device 100.

As shown in FIG. 1, the host device 100 is disposed on a server side of a link 150 and the network device 120 is a disposed on a network side of the link 150. In some embodiments, the link 150 can be associated with a single network hop (e.g., a network step that cannot be defined topographically, or a network step associated with a link between one MAC device and another MAC device). In some embodiments, the network device 120 and/or the host device 100 can be a component within a network or interconnection of devices that define a data center network. In some embodiments, the data center network can have a core portion defined by, for example, a switch fabric (e.g., a multi-stage switch fabric) such as switch fabric 130 shown in FIG. 1. In some embodiments, the link 150 can be, for example, a wired link (e.g., a physical link) or a wireless link. In some embodiments, the link 150 can be referred to as a connection. In some embodiments, the link 150 can be a bi-directional link that can be half-duplex or full duplex.

In some embodiments, the network device 120 can be configured to function as a gateway device between the switch fabric 130 and the host device 100 and/or other devices (not shown), which can be configured to handle data based on different protocols. For example, the host device 100 can be configured to communicate based on an Ethernet protocol and the switch fabric 130 can be a cell-based fabric where one or more portions of data (e.g., data packets) are transmitted via the switch fabric 130 in one or more cells (e.g., variable size cells, fixed size cells). In other words, the network device 120 can provide the host device 100 and/or other devices configured to communicate via one protocol with access to the switch fabric 130, which can be configured to communicate via another protocol. Thus, the link 150 can be a single network hop whereby the host device 100 can access (e.g., can send data to, can receive data from) the switch fabric 130 via the network device 120. In some embodiments, the network device 120 can be referred to as an access switch. In some embodiments, network device 120 can be configured to function as a router, a network hub device, and/or a network bridge device.

Although not shown, in some embodiments, the network device 120 can be configured to function as a gateway device for multiple host devices such as host device 100. Specifically, routing functionality between virtual resources at multiple host devices can be performed at a network device such as network device 120. This capability can facilitate scaling of host devices configured to access, for example, a switch fabric such as switch fabric 130 via a network device in a desirable fashion. More details related to this type of architecture are described in connection with FIG. 9.

The network device 120 can be configured to route (e.g., trigger routing of) data between two or more of the virtual resources 140 at the host device 100 based on one or more routing instructions. The routing instructions can be determined based on, for example, an address value (e.g., a destination MAC address value, a MAC address value look-up and forwarding). In some embodiments, the data can be routed via the link 150 between the network device 120 and the host device 100. For example, data from a first portion of the virtual resources 140 at the host device 100 can be forwarded (without routing or classifying the data) to the network device 120 via the link 150. The data can be defined at (e.g., originate at) and/or can be received at the first portion of the virtual resources 140. After being received at the network device 120, the data can be routed from the network device 120 to a second portion of the virtual resources 140 at the host device 100 via the link 150 based on a routing instruction retrieved at the network device 120. In some embodiments, the first portion of the virtual resources 140 can coincide with or can be mutually exclusive from the second portion of the virtual resources 140.

During operation, a routing instruction used to trigger routing of data between the virtual resources 140 at the host device 100 and the network device 120 can be determined based on a relationship (e.g., a classification relationship) between the virtual resources 140 and the routing instruction. Specifically, the routing instruction can be determined during a classification process based on one or more virtual resource identifiers associated with the virtual resources 140 and associated with the routing instruction. For example, in some embodiments, the routing instruction can be retrieved when a filter condition is satisfied based on one or more virtual resource identifiers associated with the virtual resources 140. Each of the virtual resources 140 or portions of the virtual resources 140 can be associated with one or more virtual resource identifiers. For example, a single virtual resource identifier can be associated with several of the virtual resources 140. In some embodiments, a single virtual resource associated with multiple virtual resources can be referred to as a multi-resource identifier. In some embodiments, a virtual port of one of the virtual resources 140 can be represented by a virtual port identifier and/or a VLAN associated with several of the virtual resources 140 can be represented by a VLAN identifier.

A virtual switch module 110 of the host device 100 can be configured to associate at least one virtual resource identifier with data before the data is forwarded (without routing) via the link 150 to a network device module 122 of the network device 120. In some embodiments, the virtual switch module 110 can be referred to as a label switch because the virtual switch module 110 can forward the data via the link 150 (e.g., single-hop link) without, for example, performing routing functions such as data classification. The virtual resource identifier can be associated with the data based on one or more entries included in a virtual resource database 112 at the host device 100. In some embodiments, a module configured to associate the virtual resource identifier with the data can be separate from or integrated into the virtual switch module 110.

After the data is received at the network device module 122, the network device module 122 can use the virtual resource identifier associated with the data to retrieve a routing instruction associated with the virtual resource identifier based on at least one relationship included in a virtual resource database 124 at the network device 120. In some embodiments, the virtual resource database 124 can include multiple linked databases (or look-up tables) that can be navigated during a classification process. The network device module 122 can be configured to route (e.g., trigger routing of, trigger layer-2 switching of) the data to, for example, one or more portions of the virtual resources 140 based on the routing instruction. In some embodiments, the virtual switch module 110 can be, for example, a virtual machine monitor (e.g., a hypervisor, virtual bridge) that has a portion configured to process virtual resource identifiers.

For example, the virtual switch module 110 can be configured to include a virtual resource identifier in a group of data originating at source virtual resource $VR_1$. The virtual resource identifier can represent (can represent a mapping of) source virtual resource $VR_1$ or a virtual port (not shown) of source virtual resource $VR_1$. The virtual resource identifier can be identified based on a relationship (e.g., a classification relationship) defined by, for example, an entry of the virtual resource database 112. The group of data, which includes the virtual resource identifier representing source virtual resource $VR_1$, can be forwarded (without routing) to the network device 120 via the link 150.

After the group of data is received at the network device 120, the network device module 122 can retrieve a routing instruction based on a relationship defined by, for example, an entry of the virtual resource database 124 and based on the virtual resource identifier representing the source virtual resource $VR_1$ and/or a destination address value (e.g., a destination MAC address value) associated with the group of data. The network device module 122 can determine that the group of data should be routed to destination virtual resource $VR_2$ based on the routing instruction. In some embodiments, the routing instruction can be determined based on an address value (e.g., a destination MAC address value) associated with the group of data. In some embodiments, the network device module 122 can determine that the group of data should be routed to destination virtual resource $VR_2$ based on an address value (e.g., a destination MAC address value) associated with the group of data and/or based on the routing instruction. In some embodiments, the group of data can be routed over the switch fabric 130 based on an address value (e.g., a destination MAC address value) associated with the group of data and/or based on the routing instruction.

Finally, the network device module 122 can be configured to send (e.g., trigger sending of) the group of data with a virtual resource identifier representing the destination virtual resource $VR_2$ via the link 150 to the virtual switch module 110. The virtual switch module 110 can be configured to determine based on an entry included in the virtual resource database 112 that the virtual resource identifier with the group of data represents the destination virtual resource $VR_2$ and is where the group of data should be forwarded (without routing). The virtual switch module 110 can then forward the group of data to destination virtual resource $VR_2$. The relationship included in the virtual resource database 112 can be substantially similar to and/or derived from the relationship included in the virtual resources database 124, and vice versa.

In some embodiments, one or more portions of the group of data (e.g., a field within the group of data, a payload of the group of data) transmitted to $VR_2$ can be modified (e.g., copied, changed) before the group of data is sent to virtual resource $VR_2$. In some embodiments, the data can be modified at, for example, the network device module 122. The modification can be performed based on the routing instruction. In some embodiments, for example, one or more portions of the group of data can be translated from a protocol compatible with virtual resource $VR_1$ to a protocol compatible with virtual resource $VR_2$ based on a routing instruction. In some embodiments, the group of data can be modified so that one or more portions of the group of data can be properly transmitted to virtual resource $VR_2$ after being received at the host device 100 via the link 150. For example, an instruction configured to trigger forwarding (without routing) to virtual resource $VR_2$ can be included in the group of data.

Relationships (e.g., classification relationships) between routing instructions and the virtual resources 140 (e.g., virtual resource identifiers) can be defined based on information related to one or more of the virtual resources 140 provisioned at the host device 100 (e.g., logically defined at the host device 100, resident at the host device 100). Accordingly, routing of data between two or more of the virtual resources 140 can be performed at the network device 120 based, at least in part, on information related to one or more of the virtual resources 140 provisioned at the host device 100. Information related to virtual resources 140 provisioned at the host device 100 can be referred to as provision information. The provision information can include, for example, an existence, a status, a functionality, a location, an identifier, and so forth of one or more of the virtual resources 140 at the host device 100. In some embodiments, the provision information can be referred to as a provision profile.

In some embodiments, the provision information can be received from a network management module (not shown) where the provision information is stored. In some embodiments, at least a portion of the provision information can be defined by a network administrator. In some embodiments, the provision information can include for example information related to mapping (e.g., a binding) of one or more of the virtual resources 140 to one or more VLANs, ACLs, and/or CoSs. More details related to a network management module are described in connection with co-pending patent application Ser. No. 12/346,623, filed Dec. 30, 2008, entitled "Methods and Apparatus for Determining a Network Topology During Network Provisioning"; co-pending patent application Ser. No. 12/346,630, filed Dec. 30, 2008, entitled "Methods and Apparatus for Distributed Dynamic Network Provisioning"; and co-pending patent application Ser. No. 12/346,632, filed Dec. 30, 2008, entitled, "Methods and Apparatus for Distributed Dynamic Network Provisioning"; all of which are incorporated by reference herein in their entireties.

In some embodiments, virtual resource identifiers associated with the virtual resources 140 and/or relationships between the virtual resources 140 (e.g., virtual resource identifiers) and routing instructions can be defined at the network device 120 during a provisioning session (also can be referred to as a discovery session). After the relationships have been defined at the network device 120, information on the relationships can be sent to the host device 100 (during the provisioning session). The relationships can be defined at the network device 120 and the information on the relationships can be sent to the host device 100 so that the network device 120 and the host device 100 can process data transmitted between the host device 100 and the network device 120 based on, for example, a common set of virtual resource identifiers and/or routing instructions associated with the virtual resources 140. The relationships between the virtual resources 140, virtual resource identifiers, and/or routing instructions can be stored in and accessed from the virtual resource database 124 of the network device 120 and/or the virtual resource database 112 of the host device 100.

The virtual resource identifiers can be unique to a domain of virtual resources to which the network device 120 is configured to send data. For example, the network device 120 can be configured to define a unique virtual resource identifier for each of the virtual resources 140 when the virtual resources 140 are included in a domain of virtual resources in communication with network device 120. In this scenario, the domain of virtual resources are the virtual resources 140 to which the network device 120 can send data via link 150. If the domain of virtual resources includes virtual resources logically defined at, for example, another host device (not shown) in addition to the virtual resources 140 logically defined at host device 100, the network device 120 can be configured to define a unique virtual resource identifier for each of the virtual resources within the domain of virtual resources. In some embodiments, virtual resource identifiers within different domains may not be unique. For example, one or more virtual resource identifiers associated with a first domain of virtual resources (which can be associated with a first link) may overlap with one or more virtual resource identifiers associated with a second domain of virtual resources (which can be associated with a second link).

Provision information related to one or more of the virtual resource 140 at (e.g., logically defined at) the host device 100 can be received by (e.g., acquired by, sent to) the network device 120 in response to a request during a provisioning session. The request can be defined by the host device 100 and/or the network device 120. In some embodiments, the provision information can be determined based on provision signals transmitted between the host device 100 and the network device 120. The exchange of provision signals between, for example, the host device 100 and the network device 120, can be referred to as provision signaling. The provision signaling can be defined based on a provision signaling protocol.

For example, a request for provision information related to one or more of the virtual resources 140 at the host device 100 can be defined at and sent from the network device module 122 of the network device 120 via the link 150 to the virtual switch module 110 of the host device 100. The request can be, for example, a request for information related to a status (e.g., an active status, a disabled status, an inactive status) of one or more of the virtual resources 140. In some embodiments, the request for provision information can be referred to as a discovery signal. In response to the request, the virtual switch module 110 of the host device 100 can be configured to send the provision information to the network device module 122 of the network device 120.

In some embodiments, provision information related to the virtual resources 140 can be used to define, at the virtual switch module 110 (rather than at the network device 120), virtual resource identifiers and/or relationships between the virtual resources 140 (e.g., virtual resource identifiers) and routing instructions. The virtual resource identifiers and/or relationships defined at the virtual switch module 110 can be sent to the network device 120 so that the network device 120 and the host device 100 can process data transmitted between the host device 100 and the network device 120 based on a common set of virtual resource identifiers and/or routing instructions. More details related to provision information and a provisioning session are described in connection with FIGS. 4 and 5.

In some embodiments, the virtual resource database 124 and/or the virtual resource database 112 can be implemented as a shared, distributed, and/or centralized database. For example, virtual resource database 124 can be a database that is shared by network device 120 and another network device (not shown). Although not shown, the virtual resource database 124 can be a database that is not local to the network device 120. For example, the virtual resource database can be disposed outside of the network device 120. Similarly, the virtual resource database 112 can be a remote database disposed outside of the host device 100.

In some embodiments, the host device 100 can be any type of device configured to execute various applications such as the virtual resources 140 shown in FIG. 1. Specifically, the host device 100 can be any type of device configured to send data over the switch fabric 130 to a destination entity (e.g., a virtual resource within a host device) via the network device 120 and/or receive data from a destination entity (e.g., a virtual resource within a host device) over the switch fabric 130 via the network device 120. In some embodiments, the functionality of the host device 100 can be substantially separate from functions related to, for example, routing and management of data center network traffic. For example, the host device 100 can be a server device (e.g., a web server device) configured to host several guest operating systems handling data for, for example, a user/customer while the functionality of the network device 120 can be substantially related to routing and management of the data center network. In some embodiments, the host device 100 and the network device 120 can be controlled by different administrative entities (e.g., different administrative organizations). Although not shown, in some embodiments, one or more of the 140 virtual resources from host device 100 can have been previously migrated to host device 100 from a different host device and/or can be migrated to a different host device.

In some embodiments, one or more portions of the host device 100 (e.g., the virtual switch module 110) and/or the network device 120 (e.g., the network device module 120) can be a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with the host device 100 (e.g., the functions associated with the virtual switch module 110 of the host device 100) can be included in different modules and/or combined into one or more modules. In some embodiments, one or more of the functions associated with the network device 120 (e.g., functions associated with the network device module 122 of the network device 120) can be included in different modules and/or combined into one or more modules.

In some embodiments, the network device 120 and/or the host device 100 can be included in one or more chassis. For example, the network device 120 can be a top-of-rack (TOR) device associated with a chassis, and the host device 100 can be a blade server within the chassis.

The switch fabric 130 can be a multi-stage switch fabric (e.g., 3-stage switch fabric, 5-stage switch fabric). For example, although not shown, the switch fabric 130 can include an ingress stage, a middle stage, and an egress stage. In some embodiments, the switch fabric 130 can be a reconfigurable (e.g., a rearrangeable) switch fabric and/or a time-division multiplexed switch fabric. In some embodiments, the switch fabric 130 can be included within a data center network (e.g., a core portion of a data center network). Specifically, the switch fabric 130 shown in FIG. 1 can define a core portion of the data center network, which can include a network or interconnection of devices.

In some embodiments, switch fabric 130 can be defined based on a Clos network architecture (e.g., a strict sense non-blocking Clos network, a Benes network) and the switch fabric 130 can include a data plane and a control plane. In some embodiments, one or more host devices can be operatively coupled one to one or more network devices (such as network device 120 shown in FIG. 1) operatively coupled to the switch fabric 130. For example, a first host device can send a data packet addressed to a second host device via an Ethernet protocol to a first network device operatively coupled to a switch fabric. The first network device can receive the data packet and send the data packet via the switch fabric using a cell-based communication protocol (e.g., based on data signals in a data plane and a control plane of the switch fabric) to a second network device operatively coupled to the second network device. The second network device can then be configured to send the data packet to the second host device via an Ethernet protocol.

Figure 2A:
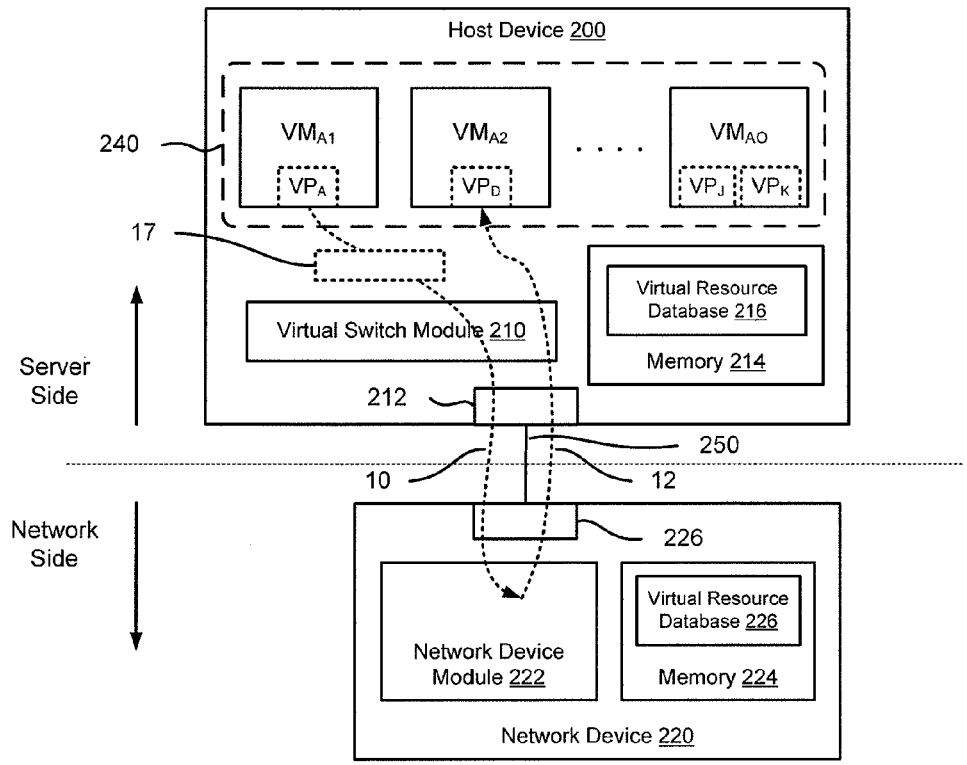
FIG. 2A is a schematic diagram that illustrates a network device configured to route a data payload between virtual machines at a host device, according to an embodiment.

FIG. 2A is a schematic diagram that illustrates a network device 220 configured to route a data payload 17 between virtual machines 240 at a host device 200, according to an embodiment. The host device 200 has virtual machines $VM_{A1}$ through $VM_{AO}$, which can collectively be referred to as virtual machines 240. As shown in FIG. 2A, each of the virtual machines 240 has at least one virtual port. For example, virtual machine $VM_{A1}$ has virtual port $VP_A$, and virtual machine $VM_{AO}$ has two virtual ports: virtual port $VP_J$ and virtual port $VP_K$. The virtual machines 240 can be, for example, virtual machines that are logically defined at the host device 200. The host device 200, which is on a server side of a link 250, includes a virtual switch module 210 and a memory 214 configured to store data associated with a virtual resource database 216. The network device 220, which is on a network side of the link 250, includes a network device module 222 and a memory 224 configured to store data associated with a virtual resource database 226. In some embodiments, the virtual machine $VM_{A1}$ and the virtual machine $VM_{A2}$ can be included, for example, in the same VLAN.

As shown in FIG. 2A, the data payload 17 is forwarded (without being routed) from virtual port $VP_A$ of virtual machine $VM_{A1}$ to the network device module 222 via transmission path 10, and from the network device module 222 via transmission path 12 to virtual port $VP_D$ of virtual machine $VM_{A2}$. In some embodiments, a copy of the data payload 17 can be routed from the network device module 222 via transmission path 12 to virtual port $VP_D$ of virtual machine $VM_{A2}$. The virtual port $VP_A$ can be referred to as a source virtual resource (e.g., a source virtual port) and the virtual port $VP_D$ can be referred to as a destination virtual resource (e.g., a destination virtual port). The data payload 17 forwarded via transmission path 10 can be referred to as a first data payload and the copy of the data payload 17 routed via transmission path 12 can be referred to as a second data payload or as an instance of data payload 17.

The transmission path 10 includes the virtual switch module 210 and the link 250. The transmission path 12 also includes the virtual switch module 210 and the link 250. The link 250 is coupled to a network card 212 (e.g., a network interface card (NIC), a MAC device) at host device 200 and coupled to a network card 226 (e.g., a NIC, a MAC device) at network device 220. The transmission path 10 can be referred to as an egress path from the host device 200 (or as an ingress path to the network device 220) and the transmission path 12 can be referred to as an ingress path to the host device 200 (or as an egress path from the network device 220).

In some embodiments, the data payload 17 can include any type of data. For example, the data payload 17 can include data related to a media signal and/or a control signal. In some embodiments, the data payload 17 can be a specified length (e.g., a specified length of several bytes).

In this embodiment, before the data payload 17 is forwarded via transmission path 10 to the network device 220, a virtual port identifier representing the virtual port $VP_A$ (the source virtual port) is associated with the data payload 17. Specifically, the virtual switch module 210 is configured to associate the virtual port identifier with the data payload 17 based on a relationship defined within the virtual resource database 216 (e.g., defined within an entry included in the virtual resource database 216). Virtual ports identifiers associated with the virtual machines 240 are shown in FIG. 2B.

Figure 2B:
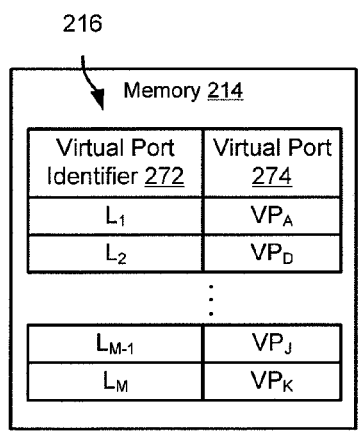
FIG. 2B is a schematic diagram that illustrates at least a portion of a virtual resource database of the host device shown in FIG. 2A, according to an embodiment.

FIG. 2B is a schematic diagram that illustrates at least a portion of the virtual resource database 216 of the host device 200 shown in FIG. 2A, according to an embodiment. As shown in FIG. 2B, the virtual resource database 216 includes virtual port identifiers $L_1$ through $L_M$ (shown in column 272) that represent virtual ports $VP_A$, $VP_D$, $VP_K$, and so forth (shown in column 274). Said differently, the entries within the virtual resource database 216 represent relationships between virtual port identifiers 272 and virtual ports 274 that are provisioned at the host device 200. In some embodiments, the entries within the virtual resource database 216 can be defined at the network device 220 (e.g., the network device module 222 of the network device 220) and received at the host device 200 during a provisioning session.

Referring back to FIG. 2A, the virtual port identifier $L_1$ (shown in FIG. 2B) representing the virtual port $VP_A$ is associated with the data payload 17 so that a routing instruction can be retrieved from the virtual resource database 226 at the network device 220 based on the virtual port identifier $L_1$ (e.g., retrieved based on a classification process). In some embodiments, for example, the virtual port identifier $L_1$ can be forwarded to the network device 220 before, with, or after the data payload 17 is sent to the network device 220. The virtual portion identifier $L_1$ can be associated with data payload 17 because the data payload 17 originated at virtual machine $VM_{A1}$ which is associated with virtual port $VP_A$. Specifically, the virtual port identifier $L_1$ can be communicated to the network device 220 so that the source virtual port $VP_A$ can be associated by the network device 220 with the data payload 17. Although not shown, the virtual port identifier $L_1$ and the data payload 17 can be included in a data packet such as that shown in FIG. 2C.

Figure 2C:
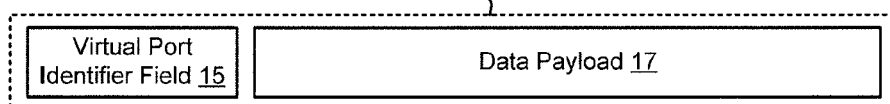
FIG. 2C is a schematic diagram that illustrates a data packet that includes the data payload shown in FIG. 2A, according to an embodiment.

FIG. 2C is a schematic diagram that illustrates a data packet 18 that includes the data payload 17 shown in FIG. 2A, according to an embodiment. As shown in FIG. 2C, the data packet 18 includes at least a virtual port identifier field 15 and the data payload 17. Although not shown, in some embodiments, the data packet 18 can also include a destination MAC address value that can be used to determine a destination of the data payload 17. In this case, the destination MAC address value can be associated with the destination virtual port $VP_D$. The virtual port identifier field 15 is a portion of the data packet 18 reserved for bit values representing a virtual port identifier such as the virtual port identifiers 272 shown in FIG. 2B. For example, virtual port identifier $L_1$, which represents virtual port $VP_A$ (as shown in FIG. 2B), can be associated with data payload 17 and included in the virtual port identifier field 15 of data packet 18 by virtual switch module 210 before the data payload 17 (also included in data packet 18) is forwarded from host device 200 via transmission path 10 shown in FIG. 2A.

The data packet 18 can include information in various headers and/or trailers (in addition to those shown in FIG. 2C) around the data payload 17 that can be used to, for example, process the data payload 17 and/or that can represent various attributes and/or related to various functions of the data packet. For example, a header portion of the data packet 18 can include a MAC address value associated with network card 212 shown in FIG. 2A. In some embodiments, the headers and/or trailers can include information related to a data packet type, a protocol used to define the data packet 18, a data packet size, a checksum value, and so forth. In some embodiments, the data packet 18 can be an internet protocol packet (e.g., an Ethernet packet).

Referring back to FIG. 2A, after the data payload 17 is received at the network device module 222, a routing instruction is retrieved from the virtual resource database 226 based on the virtual port identifier $L_1$ (the identifier representing the source virtual port $VP_A$ associated with the data payload 17). In some embodiments, for example, the routing instruction can be retrieved from the virtual resource database 226 when a filter condition (which represents a relationship) is satisfied based on the virtual port identifier $L_1$. If included in a data packet such as data packet 18 shown in FIG. 2C, the virtual port identifier $L_1$ associated with the virtual port $VP_A$ can be parsed from the data packet 18 by the network device module 222 when the data packet 18 is received. The virtual port identifier $L_1$ representing virtual port $VP_A$ can then be used by the network device module 222 to retrieve the routing instruction from the virtual resource database 226. In some embodiments, forwarding by the virtual switch module 210 and subsequent routing by the network device module 222 can be based on virtual port identifiers such as the virtual port identifier $L_1$, rather than, for example, a MAC address value, to avoid modification of the data packet 18 (or copies of the data packet 18) in an undesirable fashion.

Figure 2D:
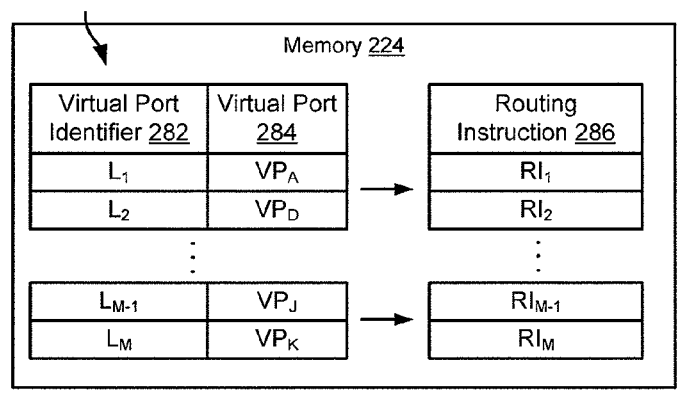
FIG. 2D is a schematic diagram that illustrates at least a portion of a virtual resource database of the network device shown in FIG. 2A, according to an embodiment.

FIG. 2D is a schematic diagram that illustrates at least a portion of the virtual resource database 226 of the network device 220 shown in FIG. 2A, according to an embodiment. As shown in FIG. 2D, the virtual resource database 226 includes virtual port identifiers $L_1$ through $L_M$ (shown in column 282) that represent virtual ports $VP_A$, $VP_D$, $VP_K$, and so forth (shown in column 284). The virtual port identifiers $L_1$ through $L_M$ are also associated with routing instructions $RI_1$ through $RI_M$ (shown in column 286). In this embodiment, the relationships between the virtual port identifiers 282 and the virtual ports 284 shown in FIG. 2D are the same as those shown in FIG. 2B. In some embodiments, one or more of the routing instructions 286 can include instructions defined based on, for example, ACLs, VLANs, and/or CoSs.

For example, routing instruction $RI_1$ can be retrieved from the virtual resource database 226 when virtual port identifier $L_1$, which is parsed from, for example, a data packet such as data packet 18 shown in FIG. 2C, satisfies at least a portion of a filter condition. The routing instruction $RI_1$ can be executed at the network device module 222. Specifically, the routing instruction $RI_1$ can be configured to trigger the network device module 222 (shown in FIG. 2A) to route the data payload 17 to virtual port $VP_D$ via transmission path 12. In some embodiments, the routing instruction $RI_1$ can be configured to trigger the network device module 222 (shown in FIG. 2A) to send the data payload 17 to virtual port $VP_D$ via transmission path 12 based on a destination MAC address value associated with $VP_D$.

The virtual port identifier $L_2$, which represents the virtual port $VP_D$, can be associated with the data payload 17 by the network device module 222 based on the routing instruction $RI_1$ before the data payload 17 is routed via the link 250 to the host device 200 (shown in FIG. 2A). The association of the virtual port identifier $L_2$ with the data payload 17 can be communicated to the host device 200 (e.g., the virtual switch module 210 of the host device 200) so that the host device 200 can forward the data payload to virtual port $VP_D$ of virtual machine $VM_{A2}$ based on the virtual port identifier $L_2$. In other words, the virtual port identifier $L_2$ representing the virtual port $VP_D$ is associated with data payload 17 (and sent to the host device 200) so that when the data payload 17 is received at the virtual switch module 210 of the host device 200, the virtual switch module 210 can forward (without routing) the data payload 17 to virtual port $VP_D$. In some embodiments, the virtual port identifier $L_2$ can function as an instruction configured to trigger the virtual switch module 210 of the host device 220 to forward (without routing) the data payload 17 to virtual port $VP_D$. In some embodiments, if the virtual port identifier VPD is included in a data packet with the data payload 17, the virtual switch module 210 can be configured to strip out the virtual port identifier $VP_D$ from the data packet before the data packet is forwarded to $VM_{A2}$.

In some embodiments, the virtual port identifier $L_2$ can be included in a virtual port identifier field of a data packet (e.g., virtual port identifier field 15 of data packet 18 shown in FIG. 2C). In some embodiments, the virtual port identifier $L_1$ included in the virtual port identifier field 15 of data packet 18 and received via transmission path 10 can be replaced with the virtual port identifier $L_2$ before the data packet 18 (or a data packet that includes a copy of data payload 17) is routed from network device module 222 via transmission path 12. Although not shown, in some embodiments, a source virtual port identifier can be included in a source virtual port identifier field of a data packet and a destination virtual port identifier can be included in a destination virtual port identifier field of a data packet.

Although not shown, in some embodiments, an instruction defined based on the routing instruction $RI_1$ retrieved from the virtual resource database 226 based on virtual port identifier $L_1$ can be associated with the data payload 17 and sent from the network device 220 to the host device 200 rather than the virtual port identifier $L_2$. The virtual switch module 210, for example, can be configured to forward the data payload 17 to the destination virtual port $VP_D$ based on the instruction. In such instances, the virtual resource database 216 can include information that can be used by the virtual switch module 210 to decode and forward based on the instruction.

In some embodiments, the virtual port identifiers 282 can be defined at the network device module 222 (shown in FIG. 2A) based on provision information related to the virtual ports 284 and acquired during a provisioning session. Relationships (which can represent one or more filter conditions) between the virtual port identifiers 282 and the routing instructions 286 can be defined during the provisioning session. Relationships between the virtual port identifiers 282, the virtual ports 284, and/or the routing instructions 286 can be sent to the host device 200 and included in the virtual resource database 216.

In some embodiments, the routing instructions can be defined by and/or can include various instructions related to, for example, policies defined based on an ACL and/or a firewall. In some embodiments, the routing instructions can include layer-2 routing instructions related to, for example, MAC address value look-up and/or forwarding based on a destination MAC address value. The routing instructions can be defined by and/or can include one or more routing policies that can be defined by, for example, a network administrator. For example, the routing instructions can include routing instructions related to discarding of a packet, routing instructions based on various fields (e.g., a ToS field) within a data packet, routing instructions based on multiple fields (e.g., combined fields) within a data packet, routing instructions based on fields related to one or more layers (e.g., layer-4) of the OSI model, routing instructions based on different protocols, and so forth. In some embodiments, the routing instruction can trigger routing over a switch fabric (not shown) in communication with the network device 220.

Figure 3:
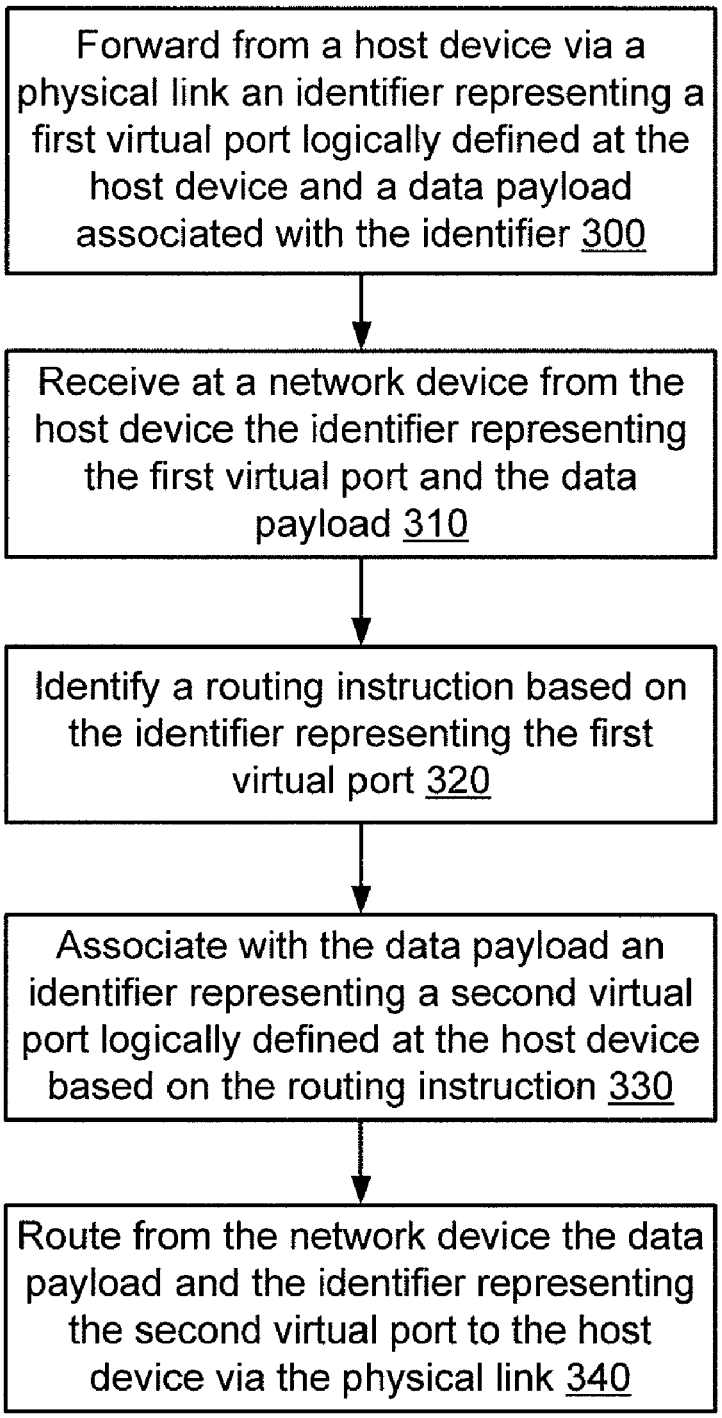
FIG. 3 is a schematic block diagram that illustrates a method for routing a data payload at a network device based on an identifier representing a virtual port, according to an embodiment.

FIG. 3 is a schematic block diagram that illustrates a method for routing a data payload at a network device based on an identifier representing a virtual port, according to an embodiment. Although the method described in connection with FIG. 3 is related to a virtual port, the method described in connection with FIG. 3 can be applied to any type of virtual resource.

As shown in FIG. 3, an identifier representing a first virtual port logically defined at the host device and a data payload associated with the identifier are forwarded from a host device via a physical link, at 300. The data payload and the identifier are forwarded via the physical link (even though a single-hop link) without routing functions such as data classification being performed at the host device. In some embodiments, the identifier representing the first virtual port and the data payload can be included in a data packet forwarded from the host device via the physical link. In some embodiments, the first virtual port can be logically defined within a virtual resource such as a virtual machine that is logically defined at the host device. The physical link can be a single-hop link. In some embodiments, the link, rather than being a physical link, can be a wireless link.

The identifier representing the first virtual port can be associated with the data payload because the data payload is from the first virtual port (e.g., transmitted from a virtual resource associated with the first virtual port). In some embodiments, the identifier representing the first virtual port can be retrieved from a database stored in a memory at the host device (or accessible from the host device). In some embodiments, one or more relationships within the database (and defined within entries of the database) can be defined at the host device during a provisioning session. More details related to a provisioning session are described in connection with FIGS. 4 and 5.

The identifier representing the first virtual port and the data payload is received at a network device from the host device, at 310. In some embodiments, the data payload and the identifier representing the first virtual port can be received at a network device module at the network device. If the identifier representing the first virtual port and the data payload are included in a data packet, the data packet can be received at the network device. In some embodiments, the identifier representing the first virtual port and the data payload can be forwarded to the network device at different times. For example, in some embodiments, identifier representing the first virtual port can be associated with a group of data payloads. The identifier representing the first virtual port can be forwarded with an indicator that the identifier representing the first virtual port is associated with the group of data payloads. In some embodiments, the network device can be, for example, an access switch associated with a switch fabric (e.g., a multi-stage switch fabric). The data payload can be received via a network interface card at the network device.

A routing instruction is identified based on the identifier representing the first virtual port, at 320. In some embodiments, the routing instruction can be retrieved from a database stored in a memory at the network device (or accessible from the network device). In some embodiments, the routing instruction can be associated with the identifier representing the first virtual port by the network device (e.g., a network device module of the network device) during a provisioning session. In some embodiments, the routing instruction can be determined based on an address value (e.g., a destination MAC address value) associated with the data payload. In some embodiments, the routing instruction can include one or more operations that supercede or can be superceded by routing determined based on an address value (e.g., a destination MAC address value) associated with the data payload. For example, data that would otherwise be routed to a particular destination based on a MAC address value can be instead dropped based on a routing instruction associated with a virtual resource identifier. In some embodiments, the routing instruction can trigger routing over a switch fabric (not shown). In some embodiments, the routing instruction can be determined based on a classification process.

An identifier representing a second virtual port logically defined at the host device is associated with the data payload based on the routing instruction, at 330. The identifier representing the second virtual port can be associated with the data payload at the network device.

The data payload and the identifier representing the second virtual port are routed to the host device from the network device via the physical link, at 340. In some embodiments, the identifier representing the second virtual port and data payload can be included in a data packet data that is defined at the network device and routed to the host device via the physical link from the network device.

In some embodiments, if the identifier representing the first virtual port and the data payload are included in a data packet that is received at the network device (as discussed in connection with block 300), the identifier representing the second virtual port can be inserted into the data packet in place of the identifier representing the first virtual port. The modified data packet can be routed to the host device from the network device. In some embodiments, the modified data packet can be referred to as a second data packet. In some embodiments, if the identifier representing the first virtual port and the data payload are included in a data packet received at the network device (as discussed in connection with block 300), a new data packet including the data payload and the identifier representing the second virtual port can be defined at the network device and the new data packet can be routed from the network device to the host device. In some embodiments, the first virtual port can be a source virtual port and the second virtual port can be a destination virtual port.

Figure 4:
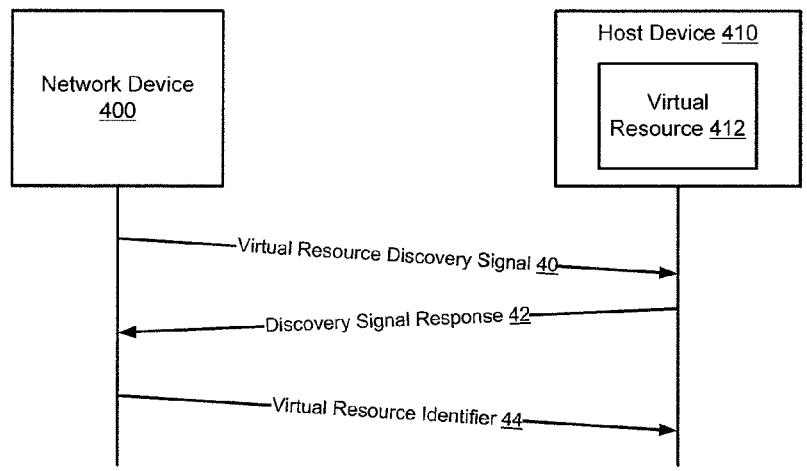
FIG. 4 is a signal flow diagram that illustrates signals transmitted between a network device and a host device during a provisioning session, according to an embodiment.

FIG. 4 is a signal flow diagram that illustrates signals transmitted between a network device 400 and a host device 410 during a provisioning session, according to an embodiment. A protocol used during the provisioning session can be referred to as a virtual resource discovery protocol or as a virtual port discovery protocol if related to virtual port discovery. The host device 410 has a virtual resource 412 that can be, for example, a virtual machine, a virtual port, and so forth. Although not shown, the signals can be transmitted between a network device module at the network device and/or a virtual switch module at the host device 410.

As shown in FIG. 4, the network device 400 is configured to send a virtual resource discovery signal 40 to the host device 410. The virtual resource discovery signal 40 can be a request for provision information related to the virtual resource 412, which is provisioned at the host device 410. The provision information can include, for example, an existence, a status, a functionality, a location, an identifier, and so forth of the virtual resource 412 at the host device 410. In some embodiments, the provision information can include identifiers defined by a network administrator such as a MAC address value and/or a VLAN grouping. In some embodiments, the virtual resource discovery signal 40 can be referred to as a request.

In some embodiments, the virtual resource discovery signal 40 can be defined based on a discovery policy. For example, the network device 400 can be configured to request specified provision information such as a status of virtual ports at the host device 410 based on a discovery policy. The discovery policy can be defined by, for example, an administrator of the network device 400. In some embodiments, the virtual resource discovery signal 40 can be referred to as a virtual port discovery signal if configured to request provision info nation related to a virtual port provisioned at the host device 410. In some embodiments, the virtual resource discovery signal 40 can be, for example, referred to as a virtual machine discovery signal if configured to request provision information related to a virtual machine provisioned at the host device 410.

In some embodiments, the virtual resource discovery signal 40 can be sent at a randomly selected time, based on a regular time interval, at a specified time based on a schedule, and so forth. For example, the virtual resource discovery signal 40 can be defined and sent from the network device 400 in response to expiration of a time interval associated with a provision time cycle. In some embodiments, the virtual resource discovery signal 40 can be sent in response to the virtual resource 412 being activated at (e.g., installed at, migrated to, enabled at) the host device 410. In some embodiments, the virtual resource discovery signal 40 can be sent in response to a broadcast signal sent from the virtual resource 412. The broadcast signal can be sent from the virtual resource 412 when the virtual resource 412 is activated at (e.g., installed at, migrated to, enabled at) the host device 410.

As shown in FIG. 4, the host device 410 can be configured to send a discovery signal response 42 to the network device. The discovery signal response 42 can include provision information requested by the network device 400 in the virtual resource discovery signal 40. Specifically, in this embodiment, the discovery signal response 42 can include provision information related to virtual resource 412.

In some embodiments, one or more requests (or portions of requests) defined within the virtual resource discovery signal 40 can be denied by, for example, the host device 410. In some embodiments, the request(s) can be denied based on a policy defined at the host device 410. In some embodiments, the discovery signal response 42 can include provision information related to only a portion of the virtual resource discovery signal 40.

In some embodiments, the discovery signal response 42 can be defined based on a response policy. For example, the host device 410 can be configured to send only specified provision information in the discovery signal response 42 such as only a functionality of the virtual resource 412 (or set of virtual resources that includes virtual resource 412) based on a response policy. The response policy can be defined by, for example, an administrator of the host device 410 and/or an administrator of the virtual resource 412.

The network device 400 can be configured to define a virtual resource identifier based on the provision information included in the discovery signal response 42. For example, the discovery signal response 42 can include an indicator of the existence of or an indicator of the active status of a virtual resource 412. In response to the indicator, the network device 400 can define a virtual resource identifier associated with the virtual resource 412.

The virtual resource identifier can be defined based on a naming convention associated with the network device 400. A protocol used to define a virtual resource identifier can be referred to as a virtual label assignment protocol (VLAP). The virtual resource identifier can be associated at the network device 400 with a routing instruction in a relationship that can be represented in a virtual resource database. In some embodiments, the virtual resource identifier can be defined based on a universally unique identifier (UUID), a globally unique identifier (GUID), and/or based on an identifier associated with a domain of virtual resources. In some embodiments, the virtual resource identifiers can be unique to a domain of virtual resources to which the network device 400 is configured to send data. The domain of virtual resources can include virtual resources (not shown) in addition to virtual resource 412.

As shown in FIG. 4, the virtual resource identifier 44 can be sent to the host device 410. In some embodiments, a relationship(s) between the virtual resource identifier and the virtual resource 412 and/or a routing instruction can be defined at the network device 400. In some embodiments, the relationship(s) can be sent to and/or stored at the host device 410. The virtual resource identifier and/or relationship(s) can be stored in a virtual resource database (not shown) at the host device 410 and/or the network device 400 where the virtual resource identifier and/or relationship(s) can be accessed.

In some embodiments, the virtual resource discovery signal 40 can be sent from the network device 400 to the host device 410 to request updated information with respect to the virtual resource 412. For example, the network device 400 may have provision information related to the existence of the virtual resource 412. The network device 400 can send the virtual resource discovery signal 40 to verify the provision information and/or to request updates related to the provision information, if any. In some embodiments, the network device 400 can send the virtual resource discovery signal 40 to the host device 410 to request information related to changes in the status of virtual resource 412 and/or VLAN association of virtual resource 412 (if virtual resource 412 has been migrated to a different VLAN).

In some embodiments, the virtual resource discovery signal 40 can be sent from the network device 400 to the host device 410 when the network device 400 is activated. In other words, the virtual resource discovery signal 40 can be triggered in response to the network device 400 being activated. In some embodiments, sending of the virtual resource discovery signal 40 from the network device 400 to the host device 410 can be triggered when the network device 400 is connected with the host device 410.

Although not shown, in some embodiments, the virtual resource 412 can be configured to broadcast provision information (e.g., information related to the existence of virtual resource 412) to network device 400 when virtual resource 412 is activated at (e.g., installed at, moved to, enabled at) host device 410. In other words, the host device 410 can be configured to actively send provision information to the network device 400 when the virtual resource 412 is activated at the host device 410. In some embodiments, at least some of the provision information can be communicated based on, for example, address resolution protocol (ARP). In some embodiments, the virtual resource 412 can be a newly-provisioned virtual resource. In these cases, the network device 400 may not be configured to send the virtual resource discovery signal 40 because the provision information will have been sent from the host device 410 to the network device 400. In some embodiments, the provision information related to the virtual resource 412 can be communicated to the network device 400 when data is transmitted from the virtual resource 412 of the host device 410 to the network device 400. In other words, the provision information can be received in response to data-triggered provisioning.

In some embodiments, the network device 400 can be notified in advance that one or more virtual resources (such as virtual resource 412) associated with the host device 410 may be modified (e.g., deleted, moved, changed). In some embodiments, this can be referred to as a migration notification. Accordingly, the network device 400 can be configured to receive (e.g., request and receive) the provision information and define, for example, one or more virtual resource identifiers and/or one or more entries in a virtual resource database based on the provision information. In some embodiments, the virtual resource identifiers and/or the one or more entries in the virtual resource database can be defined before the virtual resource(s) associated with the host device 410 is modified. More details related to methods and apparatus for provisioning of virtual resources at a host device and at a network device are set forth in co-pending patent application Ser. No. 12/346,623, filed Dec. 30, 2008, entitled "Methods and Apparatus for Determining a Network Topology During Network Provisioning"; co-pending patent application Ser. No. 12/346,630, filed Dec. 30, 2008, entitled "Methods and Apparatus for Distributed Dynamic Network Provisioning"; and co-pending patent application Ser. No. 12/346,632, filed Dec. 30, 2008, entitled, "Methods and Apparatus for Distributed Dynamic Network Provisioning"; all of which have been incorporated by reference herein in their entireties.

Figure 5:
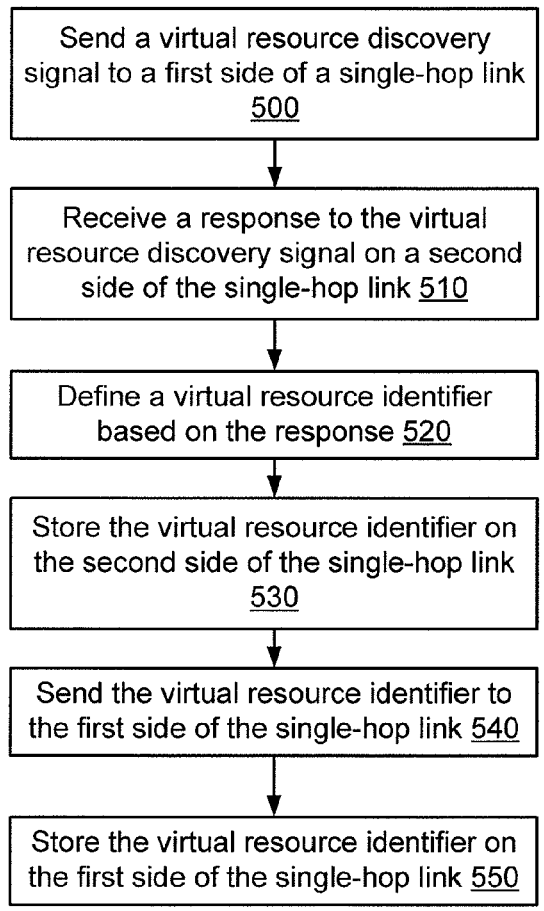
FIG. 5 is a flowchart that illustrates a method for obtaining provision information related to a virtual resource, according to an embodiment.

FIG. 5 is a flowchart that illustrates a method for obtaining provision information related to a virtual resource, according to an embodiment. The flowchart shown in FIG. 5 can be executed during, for example, a provisioning session (also can be referred to as a provision time period).

As shown in FIG. 5, a virtual resource discovery signal is sent to a first side of a single-hop link, at 500. In some embodiments, the virtual resource discovery signal can be sent from a network device (on a second side of the single-hop link) to a host device on the first side of the single-hop link. In some embodiments, the virtual resource discovery signal can be a request for provision information related to, for example, a virtual port provisioned on the first side of the single hop link.

A response to the virtual resource discovery signal is received on a second side of the single-hop link, at 510. The response to the virtual resource discovery signal can be sent to a network device on the second side of the single-hop link.

A virtual resource identifier is defined based on the response, at 520. The virtual resource identifier can represent (can represent a mapping of) a virtual resource provisioned on the first side of the single-hop link. The virtual resource identifier can be defined on the second side of the single-hop link based on, for example, provision information included in the response to the virtual resource discovery signal.

The virtual resource identifier is stored on the second side of the single-hop link, at 530. In some embodiments, the virtual resource identifier can be stored on the second side of the single-hop link in a virtual resource database. In some embodiments, a relationship between the virtual resource identifier and a routing instruction can be represented within the virtual resource database (or linked databases (e.g., look-up tables) that define the virtual resource database). In some embodiments, the routing instruction can be retrieved based on the relationship (e.g., a classification relationship) when the virtual resource identifier is retrieved from (e.g., parsed from) data received on the second side of the single-hop link. In some embodiments, the routing instruction can be retrieved from a virtual resource database during an operation time period.

The virtual resource identifier is sent to the first side of the single-hop link, at 540. The virtual resource identifier can be sent from, for example, a network device (on the second side of the single-hop link) to a host device on the first side of the single-hop link. In some embodiments, a relationship between the virtual resource identifier and a virtual resource provisioned on the first side of the single-hop link can be sent to the first side of the single-hop link. In some embodiments, a relationship between the virtual resource identifier and, for example, a routing instruction (as defined on the second side of the single-hop link) can be sent to the first side of the single-hop link.

The virtual port identifier can be stored on the first side of the single-hop link, at 550. In some embodiments, the virtual resource identifier can be stored on the first side of the single-hop link in a virtual resource database. In some embodiments, a relationship between the virtual resource identifier and, for example, a routing instruction can be represented within the virtual resource database (or linked databases (e.g., look-up tables) that define the virtual resource database).

Figure 6:
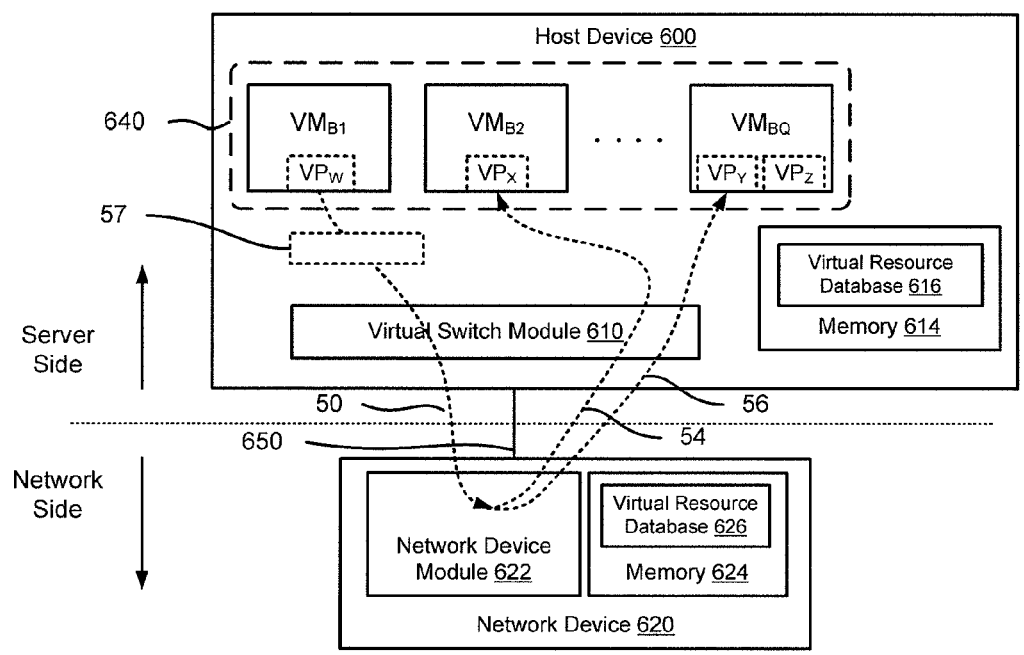
FIG. 6 is a schematic block diagram that illustrates a network device module configured to route multiple copies of a data payload between virtual machines at a host device, according to an embodiment.

FIG. 6 is a schematic block diagram that illustrates a network device module 622 configured to route multiple copies of a data payload 57 between virtual machines 640 at a host device 600, according to an embodiment. The host device 600 has virtual machines $VM_{B1}$ through $VM_{BQ}$, which can collectively be referred to as virtual resources 640. As shown in FIG. 6A, each of the virtual machines 640 has at least one virtual port. For example, virtual machine $VM_{B1}$ has virtual port $VP_W$, and virtual machine $VM_{BQ}$ has two virtual ports: virtual port $VP_Y$ and virtual port $VP_Z$. The virtual machines 640 can be, for example, virtual machines that are logically defined at the host device 600. The host device 600, which is on a server side of a link 650, includes a virtual switch module 610 and a memory 614 configured to store data associated with a virtual resource database 616. The network device 620, which is on a network side of the link 650, includes a network device module 622 and a memory 624 configured to store data associated with a virtual resource database 626.

In some embodiments, one or more of the virtual machines 640 can be associated with a VLAN grouping. For example, the virtual machines $VM_{B1}$ and virtual machine $VM_{B2}$ can define a VLAN grouping.

As shown in FIG. 6, the data payload 57 is forwarded (without being processed based on routing-related function such as a classification process) from virtual port $VP_W$ of virtual machine $VM_{B1}$ to the network device module 622 via transmission path 50. The data payload 57 (or a copy of data payload 57) is routed from the network device module 622 to virtual port $VP_X$ of virtual machine $VM_{B2}$ via transmission path 54. The data payload 57 (or a copy of data payload 57) is also routed from the network device module 622 to virtual port $VP_Y$ of virtual machine $VM_{BQ}$ via transmission path 56. The virtual port $VP_W$ can be referred to as a source virtual port and the virtual ports $VP_X$ and $VP_Y$ can be referred to as destination virtual ports.

The transmission paths 50, 54, and 56 include the virtual switch module 610 and the link 650. In some embodiments, the link 650 can be coupled to one or more network cards. In some embodiments, the data payload 57 can include any type of data (e.g., data related to a media signal).

In this embodiment, before the data payload 57 is forwarded via transmission path 50 to the network device 620, a virtual port identifier representing the virtual port $VP_W$ (the source virtual port) is associated with the data payload 57. Specifically, the virtual switch module 610 is configured to associate the virtual port identifier with the data payload 57 based on an entry included in the virtual resource database 616. The virtual port identifier associated with the data payload 57 is sent to the network device module 622.

In this embodiment, the data payload 57 is routed to virtual ports $VP_X$ and $VP_Y$ based on a routing instruction retrieved (during a classification process) from the virtual resource database 626 by the network device module 622 based on the virtual port identifier and/or based on, for example, an address value (e.g., a destination MAC address value) associated with the data payload 57. The routing instruction can be configured to trigger the network device module 622 to route the data payload 57 specifically to virtual ports $VP_X$ and $VP_Y$. In some embodiments, a routing instruction configured to trigger sending of data to multiple virtual resources can be referred to as a multi-cast routing instruction or as a broadcast routing instruction. The virtual ports $VP_X$ and $VP_Y$ can each be referred to as a destination virtual port and can collectively referred to as destination virtual ports. In some embodiments, the routing instruction can be based on an address value. For example, in some embodiments, the data payload 57 can be sent to virtual ports $VP_X$ and $VP_Y$ (from network device module 622) when a destination MAC address value is a multi-cast MAC address value (e.g., a broadcast MAC address value). The destination MAC address value can be associated with or included with the data payload 57 so that it can be received by the network device module 622 and used to determine that the data payload should be routed to virtual ports $VP_X$ and $VP_Y$.

The network device module 622 can be configured to associate and/or send an identifier representing each of the destination virtual ports with the data payload 57 (or a copy of the data payload 57) to the host device 600. The identifier representing each of the destination virtual ports can be used to forward the data payload 57 to a desired destination at the host device 600. For example, a copy of data payload 57 and a virtual port identifier representing virtual port $VP_X$ (which is associated with the copy of data payload 57) can be sent to the virtual switch module 610. The virtual switch module 610 can be configured to forward the copy of the data payload 57 to virtual port $VP_X$ based on the virtual port identifier representing virtual port $VP_X$. Specifically, the virtual switch module 610 can be configured to determine based on an entry in the virtual resource database 616 that the virtual port identifier represents the destination virtual port $VP_X$ and is where the data payload 57 should be forwarded.

In some embodiments, a multi-cast routing instruction can be configured to trigger routing of data to all or less than all virtual resources (e.g., virtual ports) associated with a VLAN (not shown). In some embodiments, one or more of the virtual ports shown in FIG. 6 can be associated with one or more VLANs. In some embodiments, a multi-cast routing instruction can be configured to trigger routing of data to specified types of virtual resources such as virtual ports associated with a VLAN. In other words, routing by the network device module 622 can be performed in a targeted fashion (to specific virtual resources). In some embodiments, routing by the network device module 622 can be different than routing that would be performed in response to routing determined based on, for example a source MAC address value and/or a destination MAC address value.

In some embodiments, the network device module 622 can be configured to route data to a subset of virtual resources from a VLAN (not shown) based on a routing instruction and/or based on an address value (e.g., a destination MAC address value) associated with the data payload 57. For example, the network device module 622 can be configured to route data to a subset of virtual resources based on multi-cast control protocol packet snooping or based on a policy stored at the network device module 622. In some embodiments, for example, a network device module (e.g., network device module 622) can be configured to route data received from a source virtual resource (e.g., virtual port $VP_W$) within a VLAN to all or a specified portion of virtual resources within the VLAN except for the source virtual resource. The network device module can be configured to determine the source virtual resource and can be configured to route the data to a group of virtual resources that excludes the source virtual resource. The network device module can be configured to determine, based on a virtual resource identifier associated with the data (e.g., the virtual port identifier associated with data payload 57), a source virtual resource of the data. In some embodiments, the network device module can be configured to interpret a broadcast instruction as an instruction to route data to all virtual resources targeted by the broadcast instruction except for the source virtual resource.

Although not shown, in some embodiments, the virtual switch module 610, for example, can be configured to prevent data payload 57 (or a copy of data payload 57) from being sent from network device 620 to virtual port $VP_W$ (which can be logically defined within virtual machine $VM_{B1}$). The virtual switch module 610 can prevent the data payload 57 from being sent from the network device 620 to virtual port $VP_W$ because $VP_W$ is the source virtual port from which the data payload 57 was sent to network device 620. For example, the network device 620 could be configured to route the data payload 57 in response to an instruction to broadcast the data payload 57 to all of the virtual machines 640 at host device 600 including virtual machine $VM_{B1}$ associated with source virtual port $VP_W$. The network device 620 may not recognize that the data payload 57 originated at virtual machine $VM_{B1}$ and was forwarded to network device 620 from virtual port $VP_W$. Accordingly, the virtual switch module 610 can be configured to trigger storage of metadata (e.g., trigger storage of metadata at memory 614) related to origination of data payloads such as data payload 57 routed from host device 600. Based on this metadata, the virtual switch module 610 can be configured to determine that data payload originated at virtual machine $VM_{B1}$ and should not be forwarded back to virtual machine $VM_{B1}$ from network device 620.

Figure 7A:
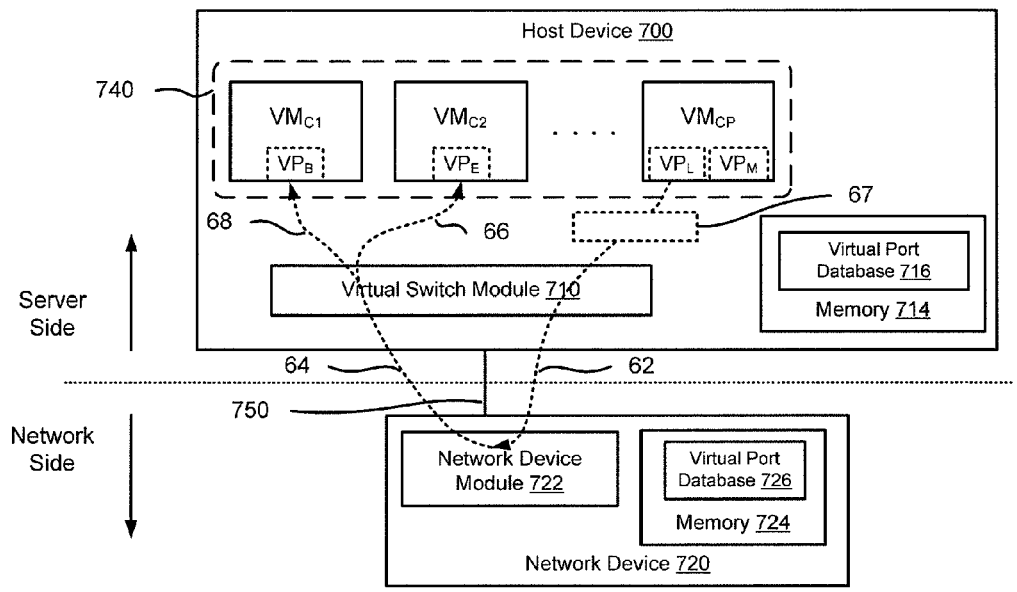
FIG. 7A is a schematic block diagram that illustrates a virtual switch module configured to forward multiple copies of a data payload to virtual machines logically defined at a host device, according to an embodiment.

FIG. 7A is a schematic block diagram that illustrates a virtual switch module 710 configured to forward multiple copies of a data payload 67 to virtual machines logically defined at a host device 700, according to an embodiment. The host device 700 has virtual machines $VM_{C1}$ through $VM_{CP}$, which can collectively be referred to as virtual machines 740. As shown in FIG. 7A, each of the virtual machines 740 has at least one virtual port. For example, virtual machine $VM_{C1}$ has virtual port $VP_B$. The host device 700, which is on a server side of a link 750, includes a virtual switch module 710 and a memory 714 configured to store data associated with a virtual resource database 716. The network device 720, which is on a network side of the link 750, includes a network device module 722 and a memory 724 configured to store data associated with a virtual resource database 726.

As shown in FIG. 7A, the data payload 67 is forwarded from virtual port $VP_L$ of virtual machine $VM_{CP}$ to the network device module 722 via transmission path 62. The data payload 67 (or a copy of data payload 67) is routed from the network device module 722 to the virtual switch module 710 via transmission path 64 based on a routing instruction. The virtual switch module 710 is configured to forward the data payload 67 (or copies of the data payload 67) to virtual port $VP_B$ of virtual machine $VM_{C1}$ via transmission path 68 and to virtual port $VP_E$ of virtual machine $VM_{C2}$ via transmission path 66. The virtual port $VP_L$ can be referred to as a source virtual port and the virtual ports $VP_B$ and $VP_E$ can be referred to as destination virtual ports.

In this embodiment, the virtual switch module 710 is configured to forward the data payload 67 to both virtual port $VP_B$ and $VP_E$ based on a multi-port identifier (e.g., based on decoding of the multi-port identifier) associated with data payload 67 and received at the virtual switch module 710 from the network device module 722 (via transmission path 64). In this case, the multi-port identifier can function as an instruction configured to trigger the virtual switch module 710 of the host device 700 to forward the data payload 67 (or copies of the data payload 67) to the virtual port $VP_B$ and $VP_E$. In some embodiments, the multi-port identifier and the data payload 67 can define (e.g., can be included in) at least a portion of a data packet (not shown) routed from the network device 720 (e.g., the network device module 722 at the network device 720) to the host device 700 (e.g., the virtual switch module 710 at the host device 700). In some embodiments, a multi-port identifier can be associated with the data payload 67 at the network device module 722 when a destination MAC address value (which is associated with or included with the data payload 67 before/when being forwarded to the network device module 722) is a multi-cast MAC address value (e.g., a broadcast MAC address value).

In some embodiments, the network device module 722 can be configured to define an instruction configured to trigger the virtual switch module 710 to trigger the host device 700 to forward the data payload 67 (or copies of the data payload 67) to the virtual port $VP_B$ and $VP_E$. In some embodiments, this instruction can be different than the routing instruction. In some embodiments, this instruction can be defined based on the routing instruction. In some embodiments, this instruction can include the multi-port identifier. In some embodiments, this instruction can include information (e.g., a header, metadata, an indicator, executable code) in addition to the multi-port identifier. In some embodiments, this instruction may not include the multi-port identifier.

The multi-port identifier can be associated with the data payload 67 by the network device module 722 before the data payload 67 is routed to the host device 700 via the link 750. In some embodiments, the multi-port identifier can be associated with the data payload 67 by the network device module 722 in response to a multi-cast routing instruction retrieved from, for example, the virtual port database 726. The multi-cast routing instruction can be retrieved from the virtual port database 726 based on a virtual port identifier associated with the data payload 67 and received at the network device module 722 (via transmission path 62). In some embodiments, the multi-cast routing instruction can be retrieved from the virtual port database 726 based on an address value (e.g., a destination MAC address value) associated with the data payload 67 and/or based on the multi-cast routing instruction. In some embodiments, the multi-port identifier can be associated with the data payload 67 (before the data payload 67 is sent to the host device 700) in response to routing determined based on an address value (e.g., a destination MAC address value) associated with the data payload 67 (the address value can be received when the data payload 67 is received at the network device 720 from the host device 700). The virtual port identifier can represent (can represent a mapping of) the source virtual port (e.g., virtual port $VP_L$) to at least a portion of the host device 700 (e.g., a physical port of the host device 700). In some embodiments, the virtual port identifier representing the source virtual port and the data payload 67 can define (e.g., can be included in) at least a portion of a data packet (not shown) sent from the host device 700 (e.g., the virtual switch module 710 at the host device 700) to the network device 720 (e.g., the network device module 722 at the network device 720).

Figure 7B:
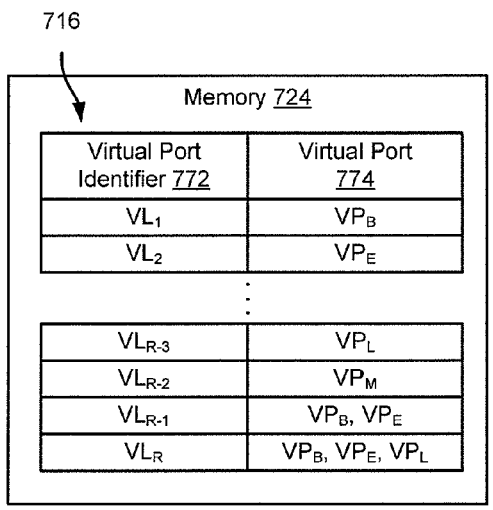
FIG. 7B is a schematic diagram that illustrates at least a portion of a virtual resource database shown in FIG. 7A, according to an embodiment.

FIG. 7B is a schematic diagram that illustrates at least a portion of the virtual resource database 716 shown in FIG. 7A, according to an embodiment. As shown in FIG. 7B, the virtual resource database 716 includes virtual port identifiers $VL_1$ through $VL_R$ (shown in column 772) that represent single virtual ports or multiple (e.g., combinations of) virtual ports shown in column 774. The virtual port identifiers are associated with multiple virtual ports and can be referred to as multi-port identifiers. The entries within the virtual resource database 716 represent relationships between virtual port identifiers 772 and virtual ports 774 that are provisioned at the host device 700. For example, virtual port identifier $VL_1$ represents virtual port $VP_B$ and virtual port identifier $VL_{R-1}$ is a multi-port virtual port identifier associated with virtual ports $VP_B$ and $VP_E$.

In some embodiments, a multi-port identifier can be defined based on a VLAN grouping. For example, the multi-port identifier $VL_R$ can be defined and associated with virtual ports $VP_B$, $VP_E$, and $VP_L$ because virtual ports $VP_B$, $VP_E$, and $VP_L$ are associated with a VLAN or the virtual machines associated with virtual ports $VP_B$, $VP_E$, and $VP_L$ define a VLAN.

In some embodiments, virtual port identifiers 772 and/or the relationships between virtual port identifiers 722 and the virtual ports 774 can be defined at the network device 720. In some embodiments, the virtual port identifiers 772 and/or the relationships between virtual port identifiers 722 and the virtual ports 774 can be defined based on provision information obtained during a provisioning session. Accordingly, the multi-port identifiers can be defined based on the provision information.

Referring back to FIG. 7A, the virtual switch module 710 can be configured to forward (without routing) the data payload 67 to both virtual port $VP_B$ and virtual port $VP_E$ based on the multi-port identifier $VL_{R-1}$, which is associated with virtual port $VP_B$ and virtual port $VP_E$ (each of which is a destination virtual port). Specifically, the network device module 722 can be configured to define a data packet that includes the multi-port identifier $VL_{R-1}$ and the data payload 67. The data packet (with the data payload 67 and multi-port identifier) can be routed from the network device module 722 to the virtual switch module 710 via the link 750. The virtual switch module 710 can be configured forward the data payload 67 to both virtual port $VP_B$ and virtual port $VP_E$ based on the multi-port identifier $VL_{R-1}$ included in the data packet.

The virtual switch module 710 can be configured to determine that the data payload 67 should be forwarded to virtual port $VP_B$ and virtual port $VP_E$ based on relationships included in the virtual port database 716 at the host device 700. The virtual port database 716 at the host device 700 can include the virtual identifier to virtual port(s) relationships shown in FIG. 7B. Specifically, the virtual switch module 710 can be configured to determine based on an entry in the virtual resource database 716 that the multi-port identifier is associated with the destination virtual ports $VP_B$ and $VP_E$, and is where the data payload 67 should be sent.

In some embodiments, virtual port identifiers and/or the relationships between virtual port identifiers and the virtual ports included in the virtual port database 716 can be received from the network device 720. In some embodiments, the virtual port identifiers and/or the relationships between virtual port identifiers and virtual ports can be received from the network device 720 after they have been defined at the network device 720 during a provisioning session.

Although not shown, in some embodiments, the network device module 722 can be configured to define a data packet that includes several virtual port identifiers that each represents single destination virtual ports (and the data payload 67), rather than a multi-port identifier associated with multiple destination virtual ports (and the data payload 67). Accordingly, the virtual switch module 710 can be configured to forward the data payload 67 to each of the virtual ports represented by the several virtual port identifiers included in the data packet. In some embodiments, the network device module 722 and/or the virtual switch module 710 can be configured to process data packets that include combinations of virtual port identifiers representing individual virtual ports and virtual port identifiers associated with multiple virtual ports.

Although this scenario is not shown in FIG. 7A, in some embodiments, the network device module 722 can be configured to receive via transmission path 62 a first data packet that includes the data payload 67, a broadcast MAC address value, and a virtual port identifier $VL_{R-3}$ (shown in FIG. 7B), which represents the source virtual port $VP_L$ from which the data packet is received. The network device module 722 can be configured to retrieve a routing instruction based on the broadcast MAC address value associated with data payload 67 in the first data packet. Specifically, the network device module 722 can be configured to determine (e.g., determine based on a classification process) that the data payload 67 should be broadcast to a VLAN that includes virtual machine $VM_{C1}$, virtual machine $VM_{C2}$, and virtual machine $VM_{CP}$. Accordingly, the network device module 722 can be configured to define a second data packet that includes the multi-port identifier $VL_R$ (shown in FIG. 7B), the data payload 67, and the source virtual port identifier $VL_{R-3}$. The multi-port identifier $VL_R$ represents the destination virtual port $VP_B$, the destination virtual port $VP_E$, and the destination virtual port $VP_L$, which are respectively associated with virtual machine $VM_{C1}$, virtual machine $VM_{C2}$, and virtual machine $VM_{CP}$. The network device 722 can be configured to route the second data packet to the virtual switch module 710 via transmission path 64.

The virtual switch module 710 can be configured to determine that the data packet 67 (or the second data packet) should only be forwarded to a subset of the destination virtual ports represented by the multi-port identifier $VL_R$. Specifically, the virtual switch module 710 can be configured to determine that the data payload 67 should be forwarded to all of the virtual ports (virtual port $VP_B$ and virtual port $VP_E$) except for the source virtual port (virtual port identifier $VL_{R-3}$). In some embodiments, this can be referred to as split horizon forwarding (and can be determined based on a split horizon forwarding algorithm). The virtual switch module 710 can be configured to determine that the data payload 67 should not be forwarded to the virtual port $VP_L$ because this virtual port is the source virtual port. This determination can be made based on the source virtual port identifier $VL_{R-3}$, which represents the source virtual port $VP_L$ and is included in the second data packet. In some embodiments, the virtual switch module 710 can be configured to remove the virtual port identifiers (single virtual port identifiers and/or multi-port identifiers) from the second data packet before forwarding the second data packet (or a third data packet defined based on the second data packet) to the destination virtual ports. In some embodiments, the split horizon forwarding can be based on, for example, a source MAC address value (instead of a source virtual port identifier) and/or another label that can be used to determine which virtual ports should not receive a data packet.

Figure 8:
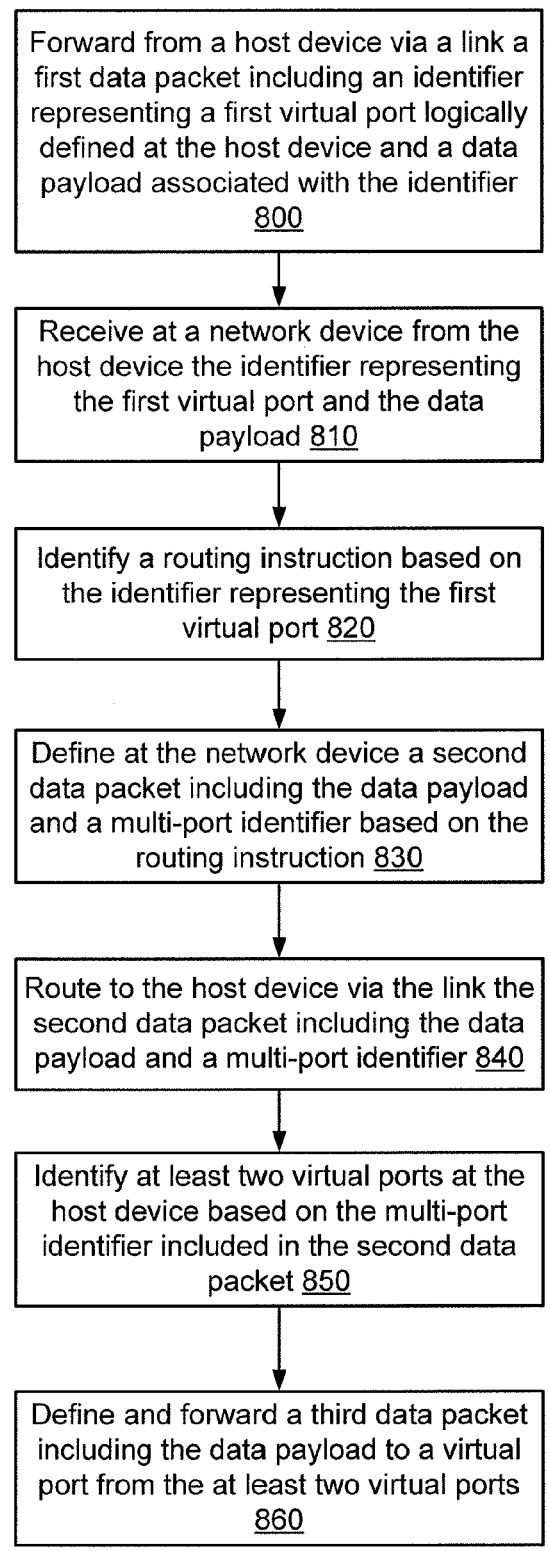
FIG. 8 is a flowchart that illustrates a method related to processing of a multi-port identifier, according to an embodiment.

FIG. 8 is a flowchart that illustrates a method related to processing of a multi-port identifier, according to an embodiment. As shown in FIG. 8, a first data packet including an identifier representing a first virtual port logically defined at the host device and a data payload associated with the identifier are forwarded from a host device via a link, at 800. In some embodiments, the first virtual port can be logically defined within a virtual resource such as a virtual machine that is logically defined at the host device. The physical link can be a single-hop link. In some embodiments, the link, rather than being a physical link, can be a wireless link. The identifier representing the first virtual port can be associated with the data payload because the data payload is from the first virtual port (e.g., from a virtual resource associated with the first virtual port).

The identifier representing the first virtual port and the data payload is received at a network device from the host device, at 810. In some embodiments, the data payload and the identifier representing the first virtual port can be received at a network device module at the network device.

A routing instruction is identified based on the identifier representing the first virtual port, at 820. In some embodiments, the routing instruction can be retrieved from a database stored in a memory at the network device (or accessible from the network device) during a classification process. In some embodiments, the routing instruction can be associated with the identifier representing the first virtual port by the network device (e.g., a network device module of the network device) during a provisioning session.

A second data packet including the data payload and a multi-port identifier is defined at the network device based on the routing instruction, at 830. In some embodiments, the data payload included in the second data packet can be a copy of the data payload received in the first data packet. The second data packet including the payload and a multi-port identifier is routed to the host device via the link, at 840.

At least two virtual ports are identified at the host device based on the multi-port identifier included in the second data packet, at 850. The virtual ports can be identified based on one or more relationships defined within a virtual resource database included at the host device. In some embodiments, the virtual ports can be identified at a virtual switch module of the host device. In some embodiments, the virtual switch module can be, for example, a virtual machine monitor (e.g., a hypervisor) configured to process multi-port identifiers.

A third data packet including the data payload is defined and forwarded to a virtual port from the at least two virtual ports, at 860. The third data packet can be defined at a virtual switch module of the host device. In some embodiments, the forwarding can be performed based on a split horizon forwarding algorithm such as that described in connection with FIGS. 7A and 7B.

Figure 9:
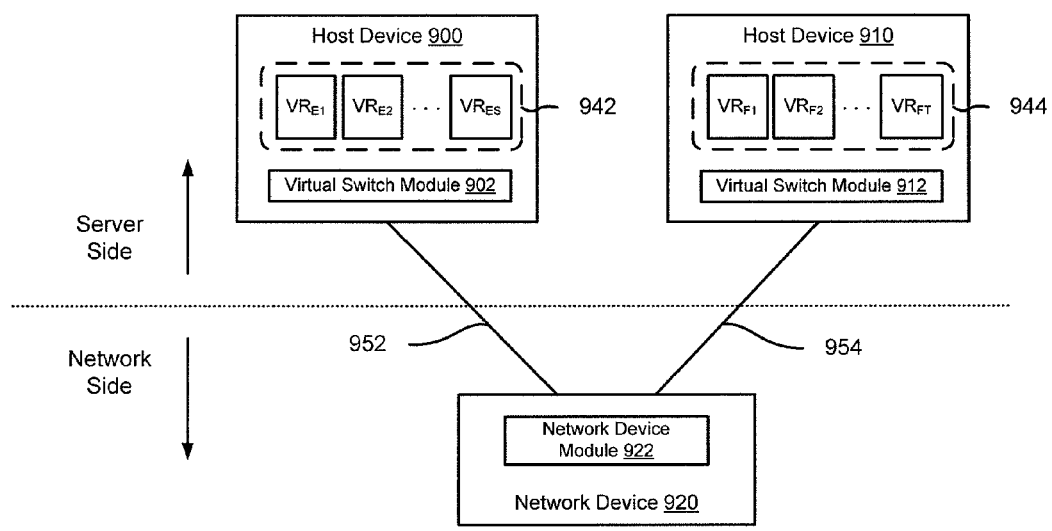
FIG. 9 is a schematic diagram that illustrates multiple host devices configured to communicate with a network device, according to an embodiment.

FIG. 9 is a schematic diagram that illustrates multiple host devices configured to communicate with a network device 920, according to an embodiment. As shown in FIG. 9, the host device 900 has virtual resources $VR_{E1}$ through $VR_{ES}$, which can collectively be referred to as virtual resources 942. The host device 910 has virtual resources $VR_{F1}$ through $VR_{FT}$, which can collectively be referred to as virtual resources 944. One or more of the virtual resources 942 and/or one or more of the virtual resources 944 can be, for example, data processing resources (e.g., computing resources) such as virtual machines and/or virtual ports.

As shown in FIG. 9, the host device 900 is disposed on a server side of a link 952 and the host device 910 is disposed on a server side of a link 954. The network device 920 is a disposed on a network side of link 952 and of link 954. In some embodiments, link 952 and/or link 954 can be associated with a single network hop and/or can be, for example, a wired link (e.g., a physical link) or a wireless link.

The network device 920 can be configured to route (e.g., trigger routing of) data between two or more of the virtual resources 942 at host device 900 and/or two or more of the virtual resources 944 at host device 910 based on one or more routing instructions. For example, data from a first portion of the virtual resources 942 at the host device 900 can be forwarded to the network device 920 via the link 952. The data can be defined at (e.g., originate at) and/or can be forwarded from the first portion of the virtual resources 942. After being received at the network device 920, the data can be routed from the network device 920 to a second portion of the virtual resources 942 at the host device 900 via the link 952 and/or to a portion of the virtual resources 944 at host device 910 via link 954 based on a routing instruction retrieved at the network device 920. Because routing is performed at the network device 920 a rich set of routing features related to, for example, ACLs can be executed at the network device 920 for many host devices such as host device 900 and/or host device 910. In addition, the burden of routing will be shifted to the network device 920 from the host device 900 and/or the host device 910.

In some embodiments, the data can be broadcast from network device module 922 to at least a portion of a VLAN that includes at least a portion of virtual resources 942 and at least a portion of virtual resources 944. In some embodiments, the data can be broadcast from network device module 922 by sending multiple packets from the network device module 922 via link 952 and/or via link 954.

In some embodiments, the data can be broadcast within, for example, host device 900 based on a multi-resource identifier received at virtual switch module 902. The multi-resource identifier can be associated with the data at the network device module 922 and sent to the virtual switch module 902 from the network device module 922. In other words, the network device module 922 can be configured to route one or more multi-resource identifiers that can, for example, trigger the virtual switch module 902 to forward the data to one or more of the virtual resources 942 within host device 900 and/or trigger the virtual switch module 912 to forward the data to one or more of the virtual resources 944 within host device 910. In such cases, the multi-resource identifier(s) sent to host device 900 and host device 910 can be the same or different. A single multi-resource identifier can be sent to host device 900 and host device 910 based on a multi-cast routing instruction, for example, when a VLAN spans both host devices.

Although not shown, the network device module 922, the virtual resource module 912, and/or the virtual resource module 902 can be configured to process data based on relationships (e.g., classification relationships) defined within one or more virtual resource databases. For example, virtual resource module 912 and virtual resource module 902 can be configured to forward data based on relationships included in a shared virtual resource database. In some embodiments, the relationships within a virtual resource database can be defined by the network device module 922 during, for example, a provisioning session.

Although not shown, in some embodiments, the host device 900 and/or the host device 910 can be configured to communicate with multiple network devices. For example, host device 900 can be configured to send and/or receive data from network device 920 as well as an additional network device (not shown).

Figure 10:
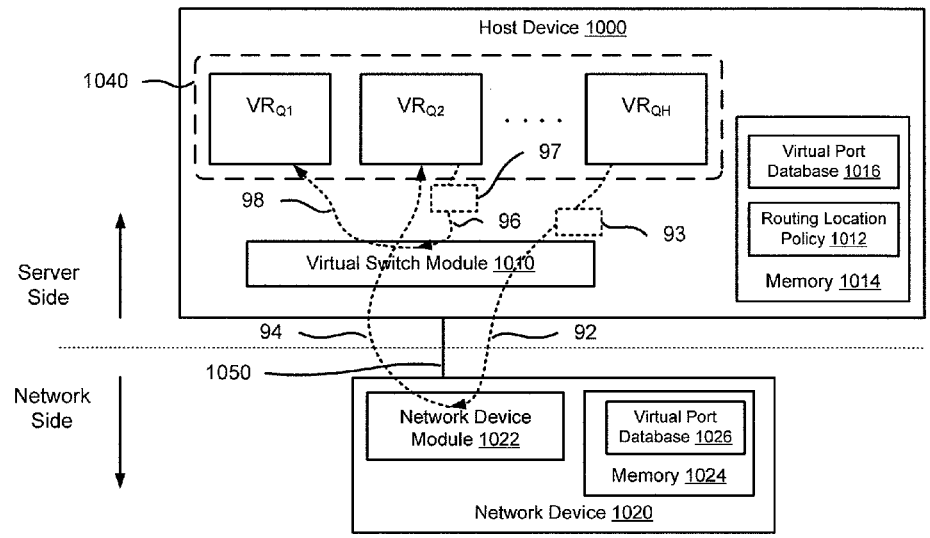
FIG. 10 is a schematic block diagram that illustrates a virtual switch module and a network device module, according to an embodiment.

FIG. 10 is a schematic block diagram that illustrates a virtual switch module 1010 and a network device module 1022, according to an embodiment. The host device 1000 has virtual machines $VR_{Q1}$ through $VR_{QH}$ (e.g., $VR_{Q1}$, $VR_{Q2}$, ... $VR_{QH}$), which can collectively be referred to as virtual resources 1040. The host device 1000, which is on a server side of a link 1050, includes a virtual switch module 1010 and a memory 1014 configured to store data associated with a virtual resource database 1016. The network device 1020, which is on a network side of the link 1050 (e.g., single-hop link between NICs), includes a network device module 1022 and a memory 1024 configured to store data associated with a virtual resource database 1026.

As shown in FIG. 10, data payload 97 is routed within (e.g., classified at) host device 1000 from one of the virtual resources 1040 to another of the virtual resources 1040, and data payload 93 is routed outside of (e.g., classified outside of, routed at a location outside of) host device 1000 from one of the virtual resources 1040 to another of the virtual resources 1040. The data payload 97 is hairpin routed at the virtual switch module 1010, and the data payload 93 is hairpin routed at the network device module 1022. Specifically, data payload 93 is forwarded (without being routed) from virtual resource $VR_{QH}$ to the network device module 1022 via transmission path 92 (which includes link 1050). The data payload 93 is then routed to virtual resource $VR_{Q2}$ via transmission path 94. In contrast, data payload 97 is sent from virtual resource $VR_{Q2}$ via transmission path 96 to virtual switch module 1010. The data payload 97 is routed by the virtual switch module 1010 to virtual resource $VR_{Q1}$ via transmission path 98 rather than being routed by the network device module 1022. Said differently, as shown in FIG. 10, a routing determination related to data payload 97 is made at the virtual switch module 1010 and a routing determination related to data payload 93 is made at the network device module 1022. The data payload 93 is forwarded via the link 1050 to the network device module 1022 without a routing determination being made (e.g., without packet classification being performed) at the virtual switch module 1010.

As shown in FIG. 10, the transmission path 96 and the transmission path 98 collectively define a transmission path (e.g., a hairpin type transmission path) that is entirely within the host device 1000. Said differently, the transmission path 96 and the transmission path 98 collectively define a transmission path that excludes the link 1050. The transmission path 92 and the transmission path 94 collectively define a transmission path (e.g., a hairpin type transmission path) that includes the link 1050. Said differently, the transmission path 92 and the transmission path 94 collectively define a transmission path that has at least a portion disposed outside of the host device 1000.

In this embodiment, data payload 97 is routed at the virtual switch module 1010 rather than at the network device module 1022 because data payload 97 originated at virtual resource $VR_{Q2}$. In some embodiments, data payloads can be routed at the virtual switch module 1010 rather than at the network device module 1022 based on a policy. In other words, a data payload can be sent, based on a policy, to the virtual switch module 1010 so that a routing determination can be made at the virtual switch module 1010 rather than at the network device module 1022. In some embodiments, the policy can be referred to as a routing location policy. The routing location policy can be defined based on a source of the data payload, the data payload type, a field in included in a data packet (e.g., a header field), and so forth. For example, a first data payload can be routed at (e.g., a routing determination can be made at) the virtual switch module 1010 rather than at the network device module 1022 because the first data payload includes a specified type of data or has a specified destination MAC address value. A second data payload that is not routed at the virtual switch module 1010 can be forwarded (without being routed) to the network device module 1022 where the data payload can be routed.

Although not shown, in some embodiments, the host device 1000 can have multiple physical ports (and multiple physical links). Data payloads can be routed at the virtual switch module 1010 rather than at the network device module 1022 based on the physical ports with which they are associated (as defined within a routing location policy). For example, a first data payload can be routed at (e.g., a routing determination related to the first data payload can be made at) the virtual switch module 1010 because the first data payload is associated with a first physical port and a second data payload can be routed at (e.g., a routing determination related to the second data payload can be made at) the network device module 1022 because the second data payload is associated with a second physical port. In some embodiments, some of the virtual resources 1040 can be switched at the network device module 1022, while other of the virtual resources 1040 can be switched at the virtual switch module 1010.

In some embodiments, a data payload can be routed at the virtual switch module 1010 rather than at the network device module 1022 based on a priority value (as defined within a routing location policy). For example, a first data payload can be routed at the virtual switch module 1010 because the first data payload includes high priority data (determined based on a priority value associated with the first data payload) and a second data payload can be routed at the network device module 1022 because the second data payload includes low priority data (determined based on a priority value associated with the second data payload), and vice versa.

In some embodiments, a data payload can be routed at the virtual switch module 1010 rather than at the network device module 1022 based on a processing latency condition (as defined within a routing location policy). For example, a data payload can be routed at the virtual switch module 1010 rather than at the network device module 1022 because the processing latency condition will be satisfied if the data payload is routed at the virtual switch module 1010 rather than at the network device module 1022.

Although not shown, in some embodiments, the routing location policy can be stored in and accessed by the virtual switch module 1010 from a memory 1014. In some embodiments, the virtual switch module 1010 can have a sub-module configured to determine based on the routing location policy whether routing should be performed at the virtual switch module 1010 and/or at the network device module 1022.

Figure 11:
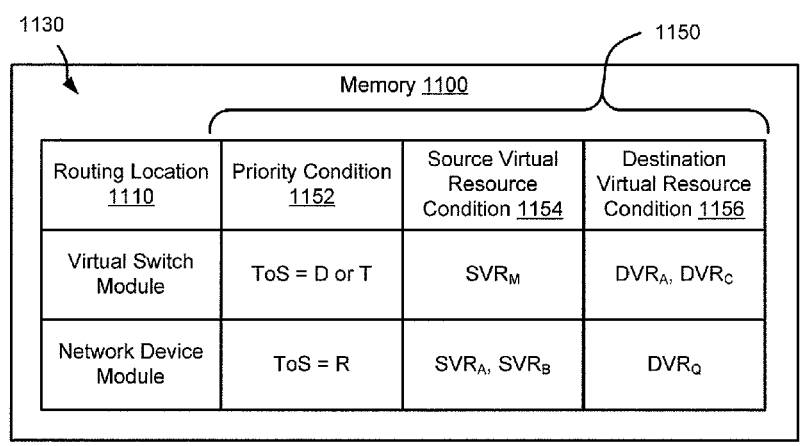
FIG. 11 is a schematic block diagram illustrates a routing location policy table, according to an embodiment.

FIG. 11 is a schematic diagram illustrates a routing location policy table 1130, according to an embodiment. The routing location policy table 1130 can be used at, for example, a host device (such as that shown in at least FIG. 10) to determine whether a routing determination related to data received at the host device should be performed at a virtual switch module at the host device or should be forwarded to a network device module at a network device where a routing determination related to the data can be performed. The routing determination (at the host device or the network device) can include, for example, classification of the data and/or hairpin routing of the data between at least two virtual resources logically defined at the host device.

As shown in FIG. 11, the routing location policy table 1130 includes a routing location column 1110 and a set of conditions 1150. The routing location is a location where a routing determination is made. The routing location column 1110 includes a virtual switch module routing location on the first row and a network device module routing location on the second row. As shown in FIG. 11, three conditions are included in the set of conditions 1150—a priority condition (column 1152), a source virtual resource condition (column 1154), and a destination virtual resource condition (column 1156). In some embodiments, more conditions than those shown in FIG. 11 can be included in the set of conditions 1150 related to a routing location policy. For example, a routing location policy can include a data packet size condition, a data packet type condition, and so forth.

In this embodiment, either the routing location of the virtual switch module (shown in column 1110) or the network device module (shown in column 1110) is selected as a location for routing (e.g., classifying, making a routing determination) data based on at least one of the set of conditions 1150 being satisfied. For example, if a data packet includes a source virtual resource address value of $SVR_M$ (column 1154), the data packet can be routed at (e.g., a routing determination can be made at) the virtual switch module (shown in column 1110). In some embodiments, for example, if a data packet includes a ToS value equal to "R," the data packet can be routed at (e.g., a routing determination can be made at) the network device module (shown in column 1110).

In some embodiments, a conflict between two or more of the conditions can be resolved based on priority values related to the conflicting conditions. For example, a data packet can have a destination virtual resource value of $DVR_Q$ (shown in column 1156) and a ToS value equal to D (shown in column 1152). Based on the destination virtual resource value of $DVR_Q$ the data packet should be routed at (e.g., a routing determination can be made at) the network device module, and based on the ToS value of D, the data packet should be routed at (e.g., a routing determination can be made at) the virtual switch module. The data packet can be routed at (e.g., a routing determination can be made at) the virtual switch module rather than at the network device module if the priority condition 1152 has a priority value that is higher than a priority value of the destination virtual resource condition 1156.

In some embodiments, one of the routing locations (column 1110) can be selected based on a combination of parameter values. For example, a data packet can be forwarded (e.g., forwarded via a virtual switch module) to the network device module for routing when a combination of a first condition and a second condition are satisfied. In some embodiments, the routing location policy can be implemented during a classification process. In other words, the routing location can be selected based on processing of one or more values (e.g., a ToS value, a source address value) included in one or more fields of a data packet based on a classification algorithm.

As shown in FIG. 11, the routing location policy 1130 can be stored in a memory 1100 as, for example, a database or as a text-based file. In some embodiments, the routing location policy 1130 can be stored in a location that can be accessed by, for example, more than one host device.

Figure 12:
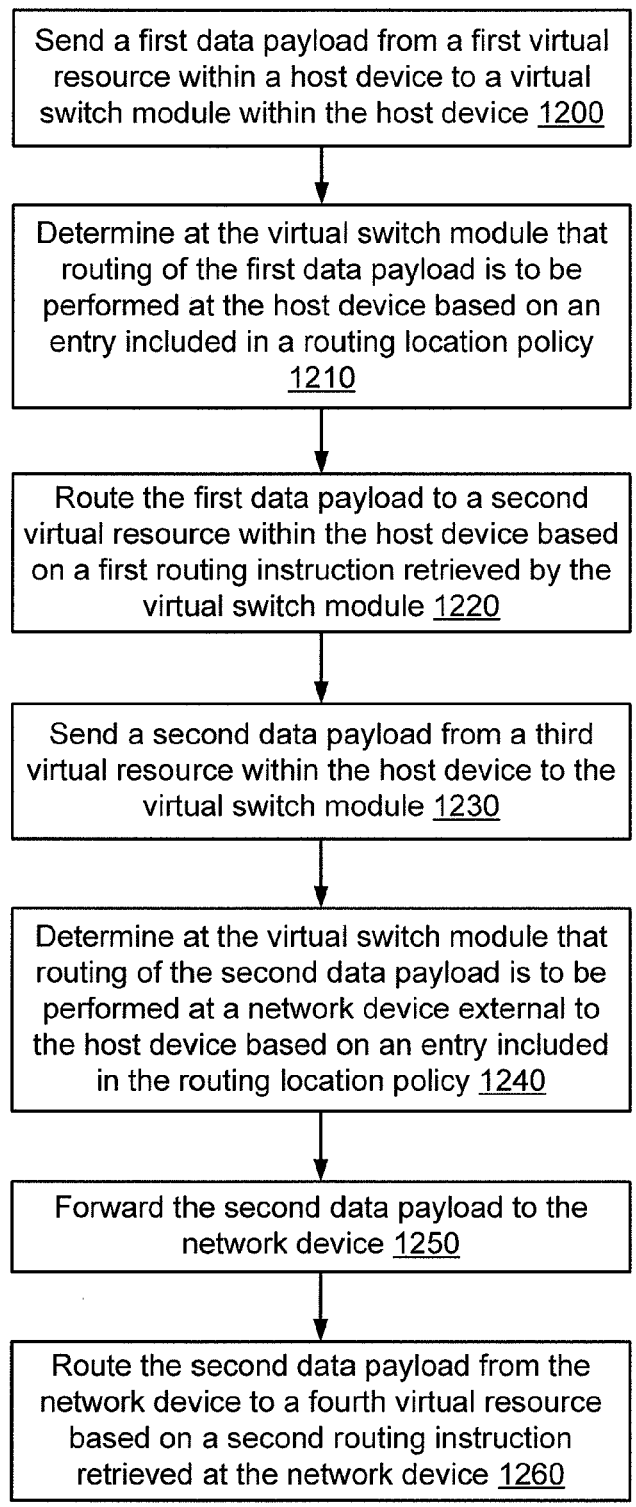
FIG. 12 is a flowchart that illustrates a method for determining a routing location based on a routing location policy, according to an embodiment.

FIG. 12 is a flowchart that illustrates a method for determining a routing location based on a routing location policy, according to an embodiment. As shown in FIG. 12, a first data payload is sent from a first virtual resource within a host device to a virtual switch module within the host device, at 1200. The first virtual resource can be, for example, a virtual port. The host device can be, for example, configured to function as a gateway device between the host device and a switch fabric (e.g., a multi-stage switch fabric).

Based on an entry included in a routing location policy, the virtual switch module can determine that routing of the first data payload (e.g., a routing determination related to the first data payload) is to be performed at the host device, at 1210. In some embodiments, the entry included in the routing location policy can include a condition defined based on a priority value, a source virtual resource, a destination virtual resource, a data type, and so forth. The host device can be selected by the virtual switch module as a routing location when one or more conditions within the routing location policy are satisfied based on one or more parameter values included in one or more fields associated with the first data payload.

The first data payload can be routed to a second virtual resource within the host device based on a first routing instruction retrieved by the virtual switch module, at 1220. The first routing instruction can be retrieved based on one or more parameter values included in the first data payload such as a destination address value or an identifier representing a source virtual resource at which the first data payload originated.

A second data payload is sent from a third virtual resource within the host device to the switch module, at 1230. The third virtual resource can be, for example, a virtual port logically defined at the host device.

The virtual switch module can determine that the routing of the second data payload is to be performed at a network device external to the host device based on an entry included in the routing location policy, at 1240. In some embodiments, the network device can function as a gateway device between a switch fabric and the host device. The network device can be selected by the virtual switch module as a routing location when one or more conditions within the routing location policy are satisfied based one or more parameter values included in one or more fields associated with the second data payload.

The second data payload is forwarded to the network device, at 1250. In some embodiments, the second data payload can be forwarded (without being routed) to the network device via a single-hop link operatively coupled to the network device and to the host device.

The second data payload is then routed from the network device to a fourth virtual resource based on a second routing instruction retrieved at the network device, at 1260. In some embodiments, the transmission path between the first virtual resource and the second virtual resource is different from the transmission path between the third virtual resource and the fourth virtual resource. The routing instruction can be retrieved based on one or more parameter values included in the second data payload such as a destination address value or an identifier representing a source virtual resource at which the first data payload originated. In some embodiments, the identifier representing the source virtual resource can be associated with the second data payload at the virtual switch module and forwarded to the network device from the virtual switch module.

Figure 13:
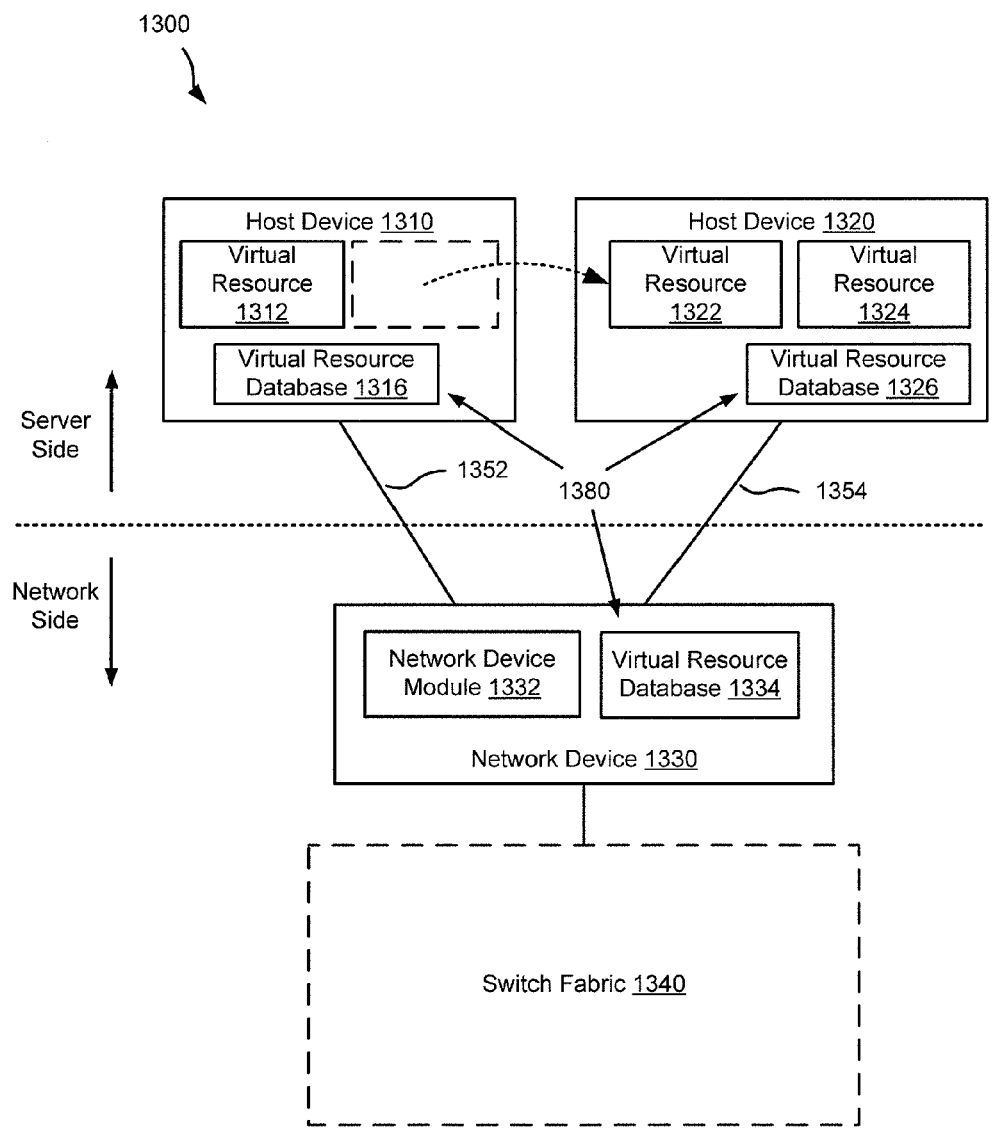
FIG. 13 is a schematic block diagram that illustrates a virtual resource configured to be migrated from one host device to another host device within at least a portion of a data center network, according to an embodiment.

FIG. 13 is a schematic diagram that illustrates a virtual resource 1322 configured to be migrated from a host device 1310 to a host device 1320 within at least a portion of a data center network 1300, according to an embodiment. The host device 1310 and the host device 1320 are on a server side of the data center network 1300, and the network device 1330 and a switch fabric 1340 (e.g., a multi-stage switch fabric) are on a network side of the data center network 1300. The network device 1330 can be configured to function as a gateway device (or as an access switch) between the host device 1310 and/or the host device 1320 on the one hand and the switch fabric 1340 on the other hand.

In some embodiments, the host device 1320 can be referred to as a target host device because the virtual resource 1322 is being migrated to the host device 1320. In some embodiments, the host device 1310 can be referred to as a source host device because the virtual resource 1322 is being migrated from the host device 1310. The virtual resource 1322 can be referred to as an original virtual resource when at (e.g., discussed with respect to) the source host device 1310, and the virtual resource 1322 can be referred to as a migrated virtual resource 1322 when at (e.g., discussed with respect to) the destination host device 1320.

The host device 1310 has a virtual resource 1312 and a virtual resource database 1316, and the host device 1320 has a virtual resource 1324 and a virtual resource database 1326. The virtual resource 1312, the virtual resource 1322, and/or the virtual resource 1324 can be, for example, a virtual machine and/or can be a virtual port. The network device 1330 is configured to communicate with the host device 1310 and the host device 1320 via link 1352 (e.g., a single-hop link) and link 1354 (e.g., a single-hop link), respectively.

Migration of the virtual resource 1322 can include not only migrating a state of the virtual resource 1322, but can also include migration of data, pointers, and so forth associated with the virtual resource 1322. In some embodiments, the state of the virtual resources 1322 can be held while the virtual resource 1322 is being migrated from host device 1310 to host device 1320. Accordingly, the state of the original virtual resource 1322 just before migration can be identical to the state of the migrated virtual resource 1322 just after migration. In some embodiments, migrated virtual resource 1322 may not be activated (and original virtual resource 1322 deactivated) until provisioning (during a provisioning session) related to the migrated virtual resources 1322 has been completed. In other words, the migrated virtual resources 1322 may not be activated until relationships related to the migrated virtual resource 1322 have been defined within the virtual resource database 1334 and/or the virtual resource database 1326. An indicator that migration of the virtual resource 1322 has been completed can be defined by and/or sent from the host device 1320, the network device 1330, and/or a network/external management module (not shown). The indicator that migration of the virtual resource 1322 has been completed can be sent to the host device 1320, the network device 1330, and/or the network/external management module.

When the virtual resource 1322 is migrated from the host device 1310 to the host device 1320, entries within the virtual resource database 1316, the virtual resource database 1326, and/or the virtual resource database 1334 with respect to the virtual resource 1322 are updated. The virtual resource database 1316, the virtual resource database 1326, and the virtual resource database 1334 can collectively be referred to as virtual resource databases 1380.

The virtual resources databases 1380 are updated so that routing and/or forwarding of data related to the virtual resource 1322 can be properly implemented given the change in location of the virtual resource 1322. Said differently, identifiers and/or relationships (e.g., classification relationships) defined based on provisioning of the original virtual resource 1322 (e.g., virtual resource 1322 at the host device 1310) may no longer be valid for the migrated virtual resource (e.g., the virtual resource 1322 at the host device 1320). Accordingly, one or more identifiers (e.g., individual identifiers, multi-cast identifiers) representing a mapping of the virtual resource 1322 to a physical location (e.g., the host device 1310) and/or one or more relationships (e.g. classification relationship) between the virtual resource 1322 and other network attributes (e.g., routing instructions, physical port location, filter conditions) can be updated.

In some embodiments, the migration of the virtual resource 1322 can be, for example, triggered by a network administrator and/or can be triggered based on a policy such as a migration policy. In some embodiments, a network administrator can trigger migration of the virtual resource 1322 based on the occurrence of one or more events. For example, migration can be triggered based on events such as failure of one or more processing resources at source host device 1310, the availability of one or more processing resources at the destination host device 1320, failure of a link (not shown) between the source host device 1310 and another device (not shown), an undesirable level of processing resource congestion at the source host device 1310, and so forth.

In some embodiments, a migration policy can be configured to trigger migration of the virtual resource 1322 when one or more conditions within the migration policy are satisfied, for example, based on one or more events such as those described above. In some embodiments, the migration of the virtual resource 1322 can be triggered based on a schedule. The schedule can be defined by, for example, a network administrator based on a migration policy and/or can be automatically defined based on a migration policy. In some embodiments, the migration of the virtual resources 1322 can occur at random times and/or periodically (e.g., at regular intervals of time).

In some embodiments, a migration policy can be implemented at (e.g., stored at, accessed at, invoked at) the host device 1310, host device 1320, the network device 1330, and/or a network management module (not shown). Accordingly, the migration of the virtual resource 1322 can be triggered by, for example, the network device 1330 when one or more conditions associated with the migration policy are satisfied based on information received at the network device 1330. For example, the network device 1330 can be configured to request and/or to receive information related to an availability of host device 1310. The network device 1330 can be configured to trigger migration of the virtual resource 1322 from the host device 1310 to the host device 1320 when a condition within a migration policy accessed at the network device 1330 is satisfied based on the availability information. In some embodiments, for example, the host device 1310 can be configured to trigger migration of the virtual resource 1322 from the host device 1310 to the host device 1320 when a condition within a migration policy is satisfied in response to failure of a processing resource within the host device 1310.

In this embodiment, the network device module 1332 can be configured to define virtual resource identifiers representing a mapping of the migrated virtual resource 1322 to the target host device 1320 (also can be referred to as an identifier representing the migrated virtual resource 1322) and/or relationships (e.g., classification relationships) between the migrated virtual resource 1322 and, for example, one or more routing instructions. Specifically, a migration notification related to the migration of the virtual resource 1322 from the host device 1310 to the host device 1320 can be sent to the network device 1330. In response to the migration notification, the network device 1330 is configured to update (or trigger updating of) one or more of the virtual resource databases 1380. The updating can be completed during an updating process.

For example, during an updating process, the network device 1330 can be configured to define an identifier that represents the migrated virtual resource 1322 (e.g., represents a mapping of the migrated virtual resource 1322 to the host device 1320). In addition, the network device 1330 can be configured to receive provision information that can be used by the network device 1330 to define one or more relationships (e.g., classification relationships) between the migrated virtual resource 1322 and, for example, one or more routing instructions. After the network device 1330 defines the identifier(s) and/or the relationship(s), the network device 1330 can be configured to send the identifier(s) and/or the relationship(s) to the host device 1310 and/or the host device 1320. Accordingly, all of the virtual resource database 1380 can be updated with a common, or a substantially common, set of identifier(s) and/or relationship(s). Specifically, the identifier(s) and/or relationship(s) related to the migrated virtual resource 1322 can be activated, and the identifier(s) and/or relationship(s) related to the original virtual resource 1322 can be disabled (e.g., deactivated, removed from one or more of the virtual resource databases 1380). Said differently, classification based on the identifier(s) and/or relationship(s) related to the migrated virtual resource 1322 can be activated, and classification based on the identifier(s) and/or relationship(s) related to the original virtual resource 1322 can be disabled (e.g., deactivated, removed from one or more of the virtual resource databases 1380).

In some embodiments, the updating process (except for activation/deactivation of the identifier(s) and/or relationship(s)) can be completed before migration of the virtual resources 1322 is completed. In some embodiments, activation/deactivation of the identifier(s) and/or relationship(s) can be triggered immediately after migration of the virtual resources 1322 is completed so that data processing related to resource 1322 can be performed without or substantially without disruption (e.g., delay).

In some embodiments, the migration notification related to migration of the virtual resource 1322 can be sent from the host device 1310 and/or the host device 1320 to the network device 1330. In some embodiments, the migration notification related to migration of the virtual resource 1322 can be sent from a network management entity (not shown) configured to manage migration of the virtual resource 1322 from the source host device 1310 to the destination host device 1320.

In some embodiments, the network device 1330 can be configured to request information related to migration of one or more virtual resources. The network device 1330 can be configured to send the request to the host device 1310, the host device 1320, and/or a network management entity. In some embodiments, the network device 1330 can be configured to periodically send the request (e.g., send the request at regular and/or irregular time intervals), send the request based on a schedule, randomly send the request, send the request in response to an event (e.g., a failure of a link, a lack of a response from a virtual resource), and so forth. In response to the request, the network device 1330 can be configured to receive a migration notification related to migration of one or more virtual resources such as virtual resource 1322.

In some embodiments, the migration notification can indicate that the migration of the virtual resource 1322 has been scheduled, for example, based on a migration policy. In some embodiments, the migration notification can indicate that the migration of the virtual resource 1322 has started. In some embodiments, the migration notification can indicate that the migration of the virtual resource 1322 is in progress (e.g., is 50% complete, is 75% complete). In some embodiments, the network device 1330 can be configured to update (or trigger updating of) one or more of the virtual resource databases 1380 when the progress of migration of the virtual resource 1322 is at a specified level.

In some embodiments, the migration notification can indicate that the migration of the virtual resource 1322 has started (e.g., been initiated). Thus, in response to start of the migration, the network device 1330 can be configured to update (or trigger updating) of one or more of the virtual resource databases 1380.

In some embodiments, the migration notification can indicate that the migration of the virtual resource 1322 has been completed. Accordingly, in response to the completion of the migration of the virtual resource 1322, the network device 1330 can be configured to update (or trigger updating) of one or more of the virtual resource databases 1380. The virtual resource databases 1380 can be stored in one or more memories (not shown).

In some embodiments, one or more portions of an updating process can be triggered based on one or more migration notifications related to migration of the virtual resource 1322. For example, the network device 1330 can be configured to define an identifier that represents the migrated virtual resource 1322 and can be configured to request provision information (and later receive the provision information in response to the request) in response to a migration notification that migration of the virtual resource 1322 has started. In some embodiments, the request (and/or a response to the request) can be defined during a provisioning session based on, for example, a virtual resource discovery protocol such as that described in connection with FIGS. 4 and 5. In some embodiments, the migration notification indicating that migration of the virtual resource has started can be received from host device 1310 and/or the host device 1320.

In response to a migration notification indicating that migration of the virtual resource 1322 is, for example, 30% complete, the network device 1330 can be configured to define one or more relationships (e.g., classification relationships) between the migrated virtual resource 1322 and, for example, one or more routing instructions based on the provision information. After the network device 1330 defines the identifier(s) and/or the relationship(s), the network device 1330 can be configured to update virtual resource database 1334, and can be configured to send the identifier(s) and/or the relationship(s) to the host device 1310 and the host device 1320 so their respective virtual resource databases—virtual resource database 1316 and virtual resource database 1326—can also be updated.

In response to a migration notification indicating that migration of the virtual resource 1322 has been completed, the identifier(s) and/or relationship(s) related to the migrated virtual resource 1322 can be activated, and the identifier(s) and/or relationship(s) related to the original virtual resource 1322 can be disabled. In some embodiments, the migration notification indicating that migration of the virtual resource 1322 has been completed can be sent to the network device 1330 so that the network device 1330 can trigger activation/deactivation identifier(s) and/or relationship(s) at the host device 1310 and/or the host device 1320. In some embodiments, the migration notification indicating that migration of the virtual resource 1322 has been completed can be sent directly to the network device 1330, the host device 1310 and/or the host device 1320 so each of these devices can locally trigger activation/deactivation of the identifier(s) and/or relationship(s).

In some embodiments, different portions of the updating process can be triggered based on a different timing than that described above. For example, the identifier(s) and/or relationship(s) related to the migrated virtual resource 1322 can be activated just before the migration of the virtual resource 1322 is completed. In some embodiments, the updating process can be triggered by a single migration notification related to migration of the virtual resource 1322 with each portion of the updating process being started after a previous portion has been completed.

In some embodiments, the host device 1310, the host device 1320, and/or the network device 1330 can be configured to hold data, for example, a transmitted from the virtual resource 1322 until migration of the virtual resource 1322 has been completed. For example, the network device 1330 can receive a migration notification indicating that migration of the virtual resource 1322 has started after receiving a data packet originating from or addressed to the original virtual resource 1322. In response to the migration notification indicating that migration of the virtual resource 1322 has started, the network device 1330 can be configured to store the data packet in a queue (not shown). In response to a migration notification indicating that migration of the virtual resource 1322 has been completed, the network device 1330 can continue to process (e.g., to route) the data packet based on updated identifier(s) and/or relationship(s) related to the migrated virtual resource 1322. Likewise, the host device 1310 and/or the host device 1320 can be configured to hold data, for example, transmitted from the virtual resource 1322 until migration of the virtual resource 1322 has been completed.

Although not shown, in some embodiments, a virtual resource (such as virtual resource 1322) can be migrated within a host device (such as host device 1310) so that the virtual resource is associated with a first link operatively coupled to the host device rather than a second link operatively coupled to the host device. Accordingly, one or more virtual resource databases associated with the migration can be updated. In some embodiments, the first link and/or the second link can be operatively coupled to one or more network devices.

Figure 14:
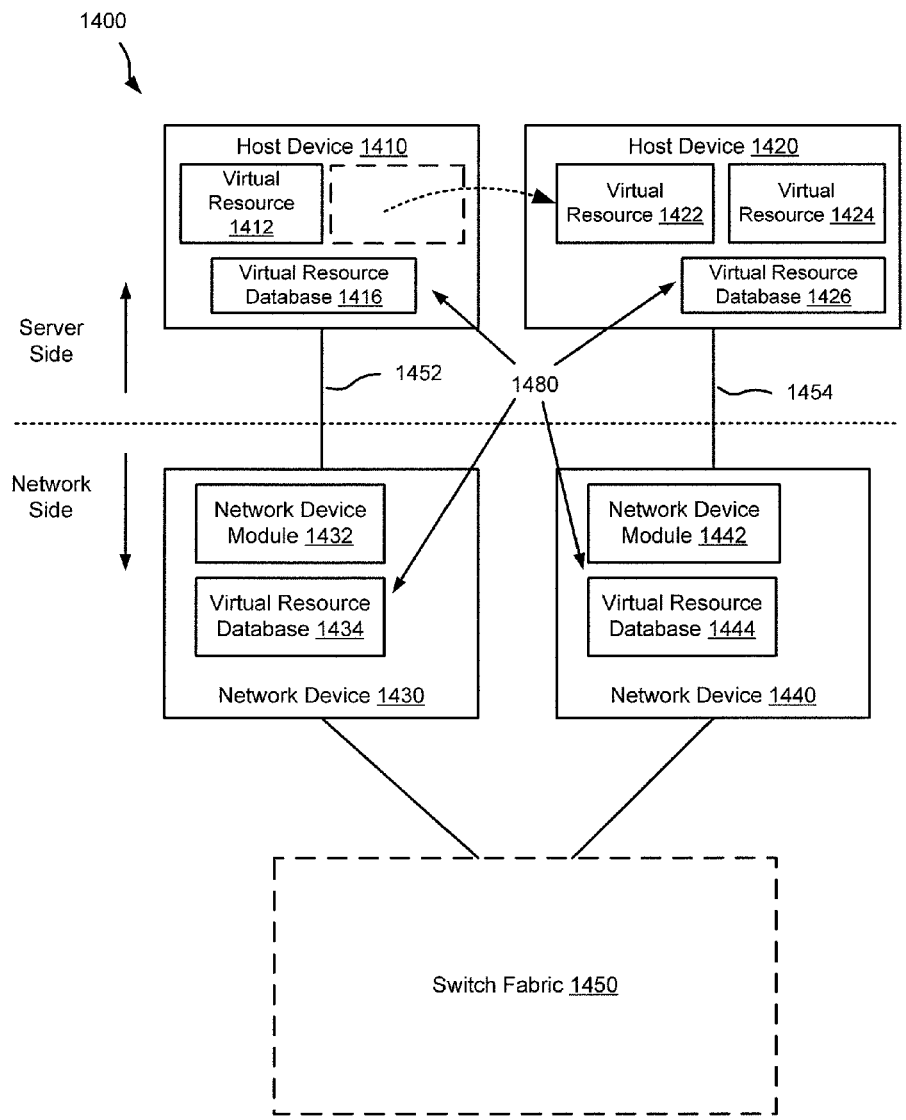
FIG. 14 is a schematic block diagram that illustrates migration of a virtual resource from a host device in communication with a network device to a host device in communication with a different network device, according to an embodiment.

FIG. 14 is a schematic block diagram that illustrates migration of a virtual resource 1422 from a host device 1410 in communication with a network device 1430 to a host device 1420 in communication with a different network device 1440, according to an embodiment. The host device 1410 and the host device 1420 are on a server side of at least a portion of a data center network 1400. The network device 1430, the network device 1440, and a switch fabric 1450 (e.g., a multistage switch fabric) are on a network side of the portion of the data center network 1400. The network device 1430 and/or the network device 1440 can be configured to function as gateway devices (or access switches) between the host device 1410 and/or the host device 1420 and the switch fabric 1450.

In some embodiments, the host device 1420 can be referred to as a target host device because the virtual resource 1422 is being migrated to the host device 1420. In some embodiments, the host device 1410 can be referred to as a source host device because the virtual resource 1422 is being migrated from the host device 1410. The virtual resource 1422 can be referred to as an original virtual resource when at (e.g., discussed with respect to) the source host device 1410, and the virtual resource 1422 can be referred to as a migrated virtual resource 1422 when at (e.g., discussed with respect to) the destination host device 1420.

The host device 1410 has a virtual resource 1412 and a virtual resource database 1416, and the host device 1420 has a virtual resource 1424 and a virtual resource database 1426. The virtual resource 1412, the virtual resource 1422, and/or the virtual resource 1424 can be, for example, a virtual machine and/or can be a virtual port. The network device 1430 is configured to communicate with the host device 1410 via link 1452 (e.g., a single-hop link), and the network device 1440 is configured to communicate with the host device 1420 via link 1454 (e.g., a single-hop link). The virtual resource database 1416, the virtual resource database 1426, the virtual resource database 1434, and the virtual resource database 1434 can collectively be referred to as virtual resource databases 1480. The virtual resource databases 1480 can be stored in one or more memories (not shown).

In this embodiment, the network device module 1442 is configured to define virtual resource identifiers for the migrated virtual resource 1422 and/or relationships (e.g., classification relationships) between the migrated virtual resource 1422 and, for example, one or more routing instructions. Moreover, identifier(s) and/or relationship(s) related to the virtual resource 1422 are defined at the network device 1440, which is in communication with the target host device 1420, rather than at the network device 1430, which is in communication with the source host device 1410. In response to the migration notification related to the migration of the virtual resource 1422 from the host device 1410 to the host device 1420, the network device 1440 is configured to update (or trigger updating of) one or more of the virtual resource databases 1480. The updating can be completed during an updating process.

For example, the network device 1440 can be configured to define an identifier that represents (represents a mapping of) the migrated virtual resource 1422 and can be configured to request provision information (and later receive the provision information in response to the request) in response to a migration notification indicating that migration of the virtual resource 1422 has started. In some embodiments, the request and/or response to the request can be defined during a provisioning session based on, for example, a virtual resource discovery protocol such as that described in connection with FIGS. 4 and 5. In some embodiments, the migration notification indicating that migration of the virtual resource has started can be received from host device 1420 and/or a network management module (not shown) in communication with one or more components within the data center network 1400.

In response to a migration notification indicating that migration of the virtual resource 1422 is, for example, nearly complete, the network device 1440 can be configured to define one or more relationship between the migrated virtual resource 1422 and, for example, one or more routing instructions based on the provision information. After the network device 1440 defines the identifier(s) and/or the relationship(s), the network device 1440 can be configured to update virtual resource database 1444, and can be configured to send the identifier(s) and/or the relationship(s) to the host device 1420 so that virtual resource database 1426 can also be updated.

In response to a migration notification indicating that migration of the virtual resource 1422 has been completed, the identifier(s) and/or relationship(s) related to the migrated virtual resource 1422 can be activated at the host device 1420 and the network device 1440. The migration notification indicating that migration of the virtual resource 1422 has been completed can be received at the network device 1440 from the host device 1420 and/or a network management module (not shown) in communication with one or more components within the data center network 1400.

The identifier(s) and/or relationship(s) related to the original virtual resource 1422 at the source host device 1410 and at the network device 1430, which is in communication with the host device 1410, can be disabled. The migration notification indicating that migration of the virtual resource 1422 has been completed can be received at the network device 1430 from the host device 1410 and/or a network management module (not shown) in communication with one or more components within the data center network 1400.

Although not shown, in some embodiments, a virtual resource (such as virtual resource 1422) can be migrated within a host device (such as host device 1410) so that the virtual resource is associated with a first link rather than a second link. The first link can be between the host device and a first network device, and the second link can be between the host device and a second network device. Accordingly, one or more virtual resource database associated the host device, the first network device and/or the second network device can be updated. Although not shown, in some embodiments, the host device 1410 and/or the host device 1420 can have a virtual switch module. Also, the network device module 1430 and/or the network device module 1440 can have a network device module.

Figure 15:
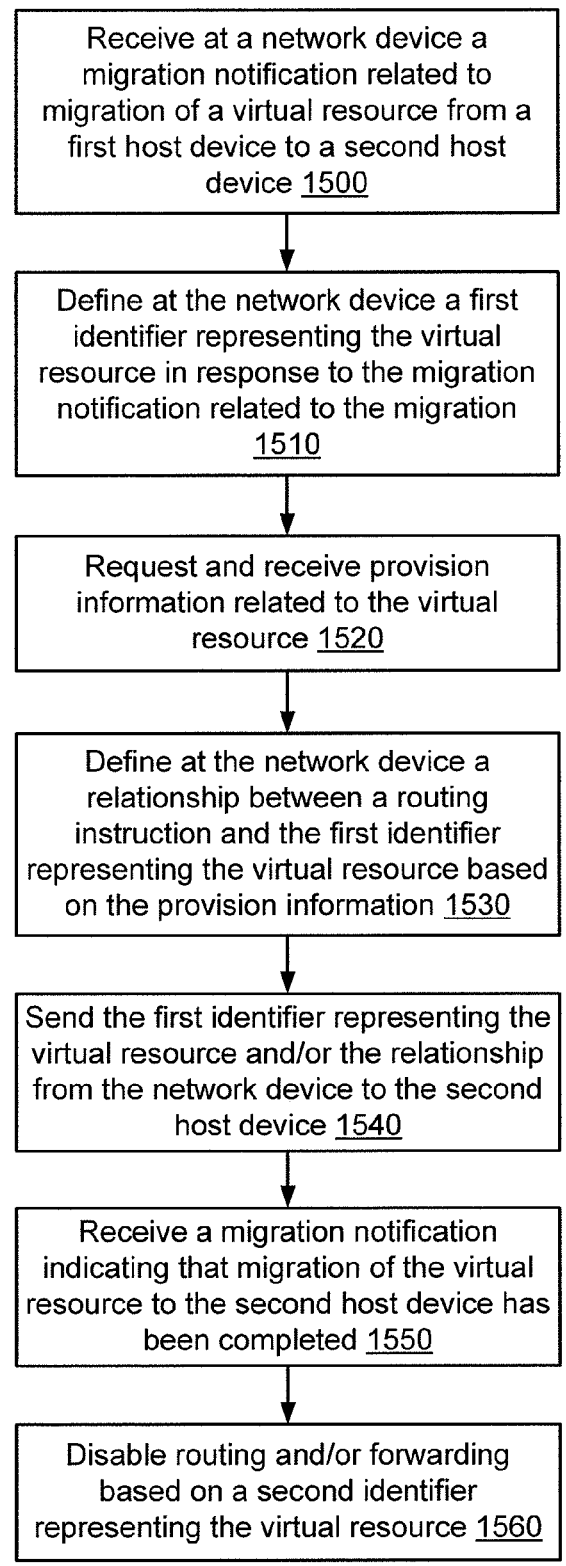
FIG. 15 is a flowchart that illustrates a method for defining a virtual resource identifier in response to migration of a virtual resource, according to an embodiment.

FIG. 15 is a flowchart that illustrates a method for defining a virtual resource identifier in response to migration of a virtual resource, according to an embodiment. As shown in FIG. 15, a migration notification related to migration of a virtual resource from a first host device to a second host device is received at a network device, at 1500. In some embodiments, the first host device can be referred to as a source host device and the second host device can be referred to as a target host device. In some embodiments, the network device can be configured to received one or more migration notifications that indicate that migration of the virtual resource has started, is in progress, and/or has been completed. In some embodiments, the network device, the first host device, and/or the second host device can define at least a portion of a data center network. In some embodiments, the migration notification can be received from the first host device, the second host device, and/or a network management module associated with the data center network.

A first identifier representing (representing a mapping of) the virtual resource is defined at the network device in response to the migration notification related to the migration, at 1510. The first identifier can be an identifier representing the virtual resource when at the second host device. In some embodiments, the first identifier representing the virtual resource can be unique within a domain of virtual resources associated with a link operatively coupled to the second host device.

Provision information related to the virtual resource is requested and received, at 1520. In some embodiments, the provision information can be requested by the network device and received at the network device. In some embodiments, the provision information can be sent from the first host device and/or the second host device to the network device. In some embodiments, the provision information can be provided to the network device without the network device requesting the provision information. For example, the provision information can be provided to the network device from the second host device in response to migration of the virtual resource starting.

A relationship (e.g., a classification relationship) between a routing instruction and the first identifier representing the virtual resource can be defined at the network device based on the provision information, at 1530. In some embodiments, the relationship can be defined based on, for example, a VLAN grouping, an ACL, and so forth associated with the virtual resource. In some embodiments, the network device can define the relationship such that the routing instruction can be retrieved based on the first identifier and/or a destination address value during a classification process.

The first identifier representing the virtual resource and/or the relationship is sent from the network device to the second host device, at 1540. In some embodiments, the first identifier representing the virtual resource and/or the relationship can be sent to the second host device from the network device after the relationship has been defined at 1530. In some embodiments, the first identifier representing the virtual resource and/or the relationship can be sent to the second host device in response to a migration notification indicating that at least a portion of the virtual resource has been migrated. In some embodiments, the first identifier representing the virtual resource and/or the relationship can be sent to the second host device in response to a migration notification indicating that at least a portion of the virtual resource has been migrated.

A migration notification indicating that migration of the virtual resource to the second host device has been completed is received, at 1550. In some embodiments, the migration notification can be received at the network device from the second host device and/or the first host device.

In response to the migration notification indicating that migration of the virtual resource has been completed (shown in block 1550), routing (e.g., routing based on classification of data) and/or forwarding based on a second identifier representing (representing a mapping of) the virtual resource can be disabled, at 1560. In some embodiments, the second identifier representing the virtual resource can be associated with the virtual resource at the first host device. In other words, the second identifier can represent (can represent a mapping of) the original virtual resource. Also, a relationship related to the virtual resource when at the first host device (i.e., the original virtual resource) can be also deactivated. In some embodiments, the second identifier and/or the relationship related to the original virtual resource can be deactivated when they are removed from one or more virtual resource databases at the first host device, the second host device, and/or the network device.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a host device can have multiple virtual switch modules and/or a host device can be configured to send data to and/or receive data from a network device via more than one link.

What is claimed is:

1. A method comprising:
    receiving over a single hop link on a network side of a data center network at a gateway device coupled to a multi-stage switch fabric a migration notification related to migration of a virtual resource from a source host device to a target host device, the source host device and the target host device being on a server side of the data center network different than the network side of the data center network and separated from the gateway device by the single hop link, the virtual resource being logically defined at the source host device; and
    defining, before migration of the virtual resource is completed, an identifier representing a mapping of the virtual resource to the target host device in response to the migration notification, the defining being performed on the network side of the data center network at the gateway device.

2. The method of claim 1, further comprising:
    sending, after the defining, the identifier from the network side of the data center network to the server side of the data center network;
    receiving from the server side of the data center network via the single-hop link a data packet including the identifier; and
    classifying, on the network side of the data center network, the data packet based on the identifier.

3. The method of claim 1, wherein the virtual resource is a first virtual resource,
    the method further comprising:
    receiving from the first virtual resource a data packet including a copy of the identifier and addressed to a second virtual resource logically defined at the target host device; and
    retrieving, based on the identifier, a routing instruction configured to trigger processing of the data packet, the retrieving being performed after the first virtual resource has been migrated to the target host device.

4. The method of claim 1, wherein the migration notification indicates a progress of the migration of the virtual resource from the source host device to the target host device.

5. The method of claim 1, wherein the migration notification indicates that migration of the virtual resource from the source host device to the target host device has been completed.

6. The method of claim 1, wherein the migration notification indicates that migration of the virtual resource is in progress at a first time,
the method further comprising:
sending a request for provision information related to the virtual resource in response to the migration notification;
receiving the provision information in response to the request; and
defining, during the migration of the virtual resource, a relationship between a routing instruction and the identifier based on the provision information.

7. The method of claim 1, wherein the migration notification is a first migration notification that indicates that migration of the virtual resource has started,
the method further comprising:
receiving a second migration notification, the second migration notification indicating that migration of the virtual resource from the source host device to the target host device has been completed; and
sending, in response to the second migration notification, an indicator to the source host device that an identifier representing a mapping of the virtual resource to the source host device is invalid.

8. The method of claim 1, further comprising:
defining, in response to the migration notification, an identifier representing a virtual local area network (VLAN) grouping including the virtual resource.

9. An apparatus comprising:
a first network device in communication with a first host device and configured to classify data addressed to a virtual resource based on an identifier representing a mapping of the virtual resource to the first host device, the virtual resource being logically defined at the first host device, the first host device being separated from a multi-stage switch fabric by a single hop link; and
a second network device configured to define a gateway between the multi-stage switch fabric and the first host device via the single hop link, the second network device configured to receive a migration notification related to migration of the virtual resource from the first host device to a second host device in communication with the second network device, the second network device configured to define an identifier representing a mapping of the virtual resource to the second host device in response to the migration notification, the identifier associated with the second host being activated after migration of the virtual resource is completed.

10. The apparatus of claim 9, wherein the first network device is configured to classify the data until migration of the virtual resource from the first host device to a second host device is completed.

11. The apparatus of claim 9, wherein the identifier associated with the first host is associated with a link between the first host device and the first network device, the identifier associated with the second host is associated with a link between the second host device and the second network device.

12. The apparatus of claim 9, wherein the second network device is configured to send the identifier associated with the second host to the second host device before migration of the virtual resource from the first host device to the second host device has been completed.

13. The apparatus of claim 9, wherein the second network device is configured to define a relationship between the identifier associated with the second host and a routing instruction before migration of the virtual resource from the first host device to the second host device has been completed.

14. The apparatus of claim 9, wherein the virtual resource is included in a domain of virtual resources associated with a link between the second network device and the second host device, the identifier associated with the second host is unique with respect to the domain of virtual resources, but not unique outside of the domain of virtual resources.

15. The apparatus of claim 9, wherein the first network device is configured to deactivate the first identifier when migration of the virtual resource has been completed.

16. An apparatus comprising:
a memory disposed on a network side of a single hop link, the network side including a multi-stage switch fabric, and the memory configured to store a plurality of virtual port identifiers, each virtual port identifier from the plurality of virtual port identifiers being uniquely associated with a virtual port from a plurality of virtual ports logically defined at a host device disposed on a server side of the single hop link, the host device separated from the multi-stage switch by the single hop link; and
a network device configured to define a gateway between the multi-stage switch fabric and the host device via the single hop link, the network device configured to define a classification relationship between at least a portion of the plurality of virtual port identifiers and a routing instruction in response to a migration notification indicating that a virtual port from the plurality of virtual ports is being migrated to the host device, the network device module configured to enable classification of a data packet received from the host device based on the classification relationship after migration of the virtual port has been completed.

17. The apparatus of claim 16, wherein the network device is configured to define a virtual local area network (VLAN) grouping associated with the plurality of virtual port identifiers.

18. The apparatus of claim 16, wherein the network device is configured to define the classification relationship based on provision information received in response to the migration notification.

19. The apparatus of claim 16, wherein the network device is configured to define a request for provision information related to the portion of the plurality of virtual resources in response to the migration notification, the network device is configured to receive the provision information, the network device is configured to define the classification relationship based on the provision information.

20. The apparatus of claim 16, wherein the network device is configured to send the defined classification relationship to the host device via the single-hop link.

* * * * *